US 8,645,016 B2

(12) United States Patent
Durkos et al.

(10) Patent No.: US 8,645,016 B2
(45) Date of Patent: *Feb. 4, 2014

(54) ROBOTIC VEHICLE CONTROLLER

(75) Inventors: Larry G. Durkos, Lebanon, IN (US); Michael J. Blackburn, Indianapolis, IN (US); Kyle B. Ruddock, Fishers, IN (US); Richard S. Koressel, Carmel, IN (US); Thomas A. McCalley, Carmel, IN (US)

(73) Assignee: I-Guide Robotics, Inc., Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/567,442

(22) Filed: Aug. 6, 2012

(65) Prior Publication Data

US 2012/0303202 A1    Nov. 29, 2012

Related U.S. Application Data

(63) Continuation of application No. 12/087,963, filed as application No. PCT/US2007/060726 on Jan. 18, 2007, now Pat. No. 8,239,083.

(60) Provisional application No. 60/760,011, filed on Jan. 18, 2006.

(51) Int. Cl.
    *G01C 22/00*      (2006.01)
(52) U.S. Cl.
    USPC ............... 701/26; 701/23; 701/25; 701/532; 700/245
(58) Field of Classification Search
    USPC ........... 701/23, 25, 26, 69, 81, 532; 700/245, 700/258, 259
    See application file for complete search history.

(56) References Cited

U.S. PATENT DOCUMENTS

| 4,465,155 A | 8/1984 | Collins |
| 4,500,970 A | 2/1985 | Daemmer |
| 4,694,639 A | 9/1987 | Chen et al. |
| 4,868,752 A | 9/1989 | Fujii et al. |
| 4,903,212 A | 2/1990 | Yokouchi et al. |
| 5,040,116 A | 8/1991 | Evans, Jr. et al. |
| 5,204,814 A * | 4/1993 | Noonan et al. ............ 701/25 |
| 5,331,561 A | 7/1994 | Barrett et al. |
| 5,353,512 A | 10/1994 | Theurer et al. |
| 5,410,479 A | 4/1995 | Coker |
| 5,496,450 A | 3/1996 | Blumenthal et al. |
| 5,528,888 A | 6/1996 | Miyamoto et al. |
| 5,539,647 A | 7/1996 | Shibata et al. |
| 5,563,786 A | 10/1996 | Torii |
| 5,610,815 A | 3/1997 | Gudat et al. |

(Continued)

FOREIGN PATENT DOCUMENTS

EP    0 489 915 A1    6/1992

OTHER PUBLICATIONS

Pioppi, A., "Tomorrow's Mowers? Unmanned computer-aided machines draw rave reviews from superintendents", Golfdom, pp. 1-3, Feb. 1, 2004, http://www.golfdom.com/golfdom/content/printContentPopup.jsp?id=83066.

(Continued)

*Primary Examiner* — Gertrude Arthur Jeanglaude
(74) *Attorney, Agent, or Firm* — Faegre Baker Daniels LLP

(57) ABSTRACT

A control system is provided for automatically moving at least one machine along a desired path.

19 Claims, 30 Drawing Sheets

(56) References Cited

U.S. PATENT DOCUMENTS

| | | | |
|---|---|---|---|
| 5,646,844 A | 7/1997 | Gudat et al. | |
| 5,684,476 A | 11/1997 | Anderson | |
| 5,838,562 A | 11/1998 | Gudat et al. | |
| 5,897,603 A | 4/1999 | Henderson | |
| 5,956,250 A | 9/1999 | Gudat et al. | |
| 5,974,347 A | 10/1999 | Nelson | |
| 5,992,758 A | 11/1999 | Mack | |
| 6,052,647 A | 4/2000 | Parkinson et al. | |
| 6,085,130 A | 7/2000 | Brandt et al. | |
| 6,088,644 A | 7/2000 | Brandt et al. | |
| 6,112,143 A | 8/2000 | Allen et al. | |
| 6,128,574 A | 10/2000 | Diekhans | |
| 6,195,609 B1 | 2/2001 | Pilley et al. | |
| 6,230,100 B1 | 5/2001 | Geier | |
| 6,255,793 B1 | 7/2001 | Peless et al. | |
| 6,321,158 B1 | 11/2001 | DeLorme et al. | |
| 6,338,013 B1 | 1/2002 | Ruffner | |
| 6,358,174 B1 | 3/2002 | Folsom et al. | |
| 6,415,227 B1 | 7/2002 | Lin | |
| 6,426,694 B1 | 7/2002 | Larson | |
| 6,445,983 B1 | 9/2002 | Dickson et al. | |
| 6,480,768 B1 | 11/2002 | Torii | |
| 6,502,017 B2 | 12/2002 | Ruffner | |
| 6,547,012 B2 | 4/2003 | Scarlett et al. | |
| 6,611,738 B2 | 8/2003 | Ruffner | |
| 6,650,975 B2 | 11/2003 | Ruffner | |
| 6,678,394 B1 | 1/2004 | Nichani | |
| 6,732,024 B2 | 5/2004 | Wilhelm Rekow et al. | |
| 6,834,220 B1 | 12/2004 | Bail | |
| 6,886,646 B2 * | 5/2005 | Sugimoto et al. | 180/6.48 |
| 7,006,037 B2 | 2/2006 | Kim | |
| 7,142,956 B2 | 11/2006 | Heiniger et al. | |
| 7,224,973 B2 | 5/2007 | Tsutazawa et al. | |
| 7,349,759 B2 | 3/2008 | Peless et al. | |
| 7,581,603 B2 | 9/2009 | Hammonds | |
| 7,711,480 B2 | 5/2010 | Robbins | |
| 8,239,083 B2 * | 8/2012 | Durkos et al. | 701/26 |
| 2002/0104300 A1 | 8/2002 | Hunt | |
| 2004/0133316 A1 | 7/2004 | Dean | |
| 2004/0210359 A1 | 10/2004 | Herz | |
| 2005/0038578 A1 | 2/2005 | McMurtry et al. | |
| 2005/0053447 A1 | 3/2005 | Bucher et al. | |
| 2005/0055142 A1 | 3/2005 | McMurtry et al. | |
| 2005/0060232 A1 | 3/2005 | Maggio | |
| 2005/0105599 A1 | 5/2005 | Jeong et al. | |
| 2005/0234610 A1 | 10/2005 | Shimizu et al. | |
| 2005/0254948 A1 | 11/2005 | Koch et al. | |
| 2006/0012144 A1 | 1/2006 | Kunzler et al. | |
| 2006/0020369 A1 | 1/2006 | Taylor et al. | |
| 2006/0027677 A1 | 2/2006 | Abts | |
| 2006/0064212 A1 | 3/2006 | Thorne | |
| 2006/0132318 A1 * | 6/2006 | Shimizu | 340/575 |
| 2006/0184013 A1 | 8/2006 | Emanuel et al. | |
| 2007/0127985 A1 | 6/2007 | Halonen et al. | |
| 2007/0198159 A1 | 8/2007 | Durkos et al. | |
| 2007/0208442 A1 | 9/2007 | Perrone | |
| 2007/0260394 A1 | 11/2007 | Dean | |
| 2008/0033645 A1 | 2/2008 | Levinson et al. | |
| 2008/0039991 A1 | 2/2008 | May et al. | |
| 2008/0049217 A1 | 2/2008 | Cappelletti | |
| 2008/0068297 A1 | 3/2008 | Gilbert | |
| 2010/0207754 A1 | 8/2010 | Shostak et al. | |

OTHER PUBLICATIONS

Rizos, C., Han S., "Reference Station Network Based RTK Systems—Concepts and Progress", Date Unknown.

Van Cranenbroeck, J., "A New Total Station Tracking GPS Satellites in a Network RTK Infrastructure Perspective", Pharaohs to Geoinformatics, FIG Working Week 2005, GSDI-8, Cairo, Egypt, Apr. 16-21, 2005 pp. 1-5.

Buick, R., "RTK base station networks driving adoption of GPS +/− 1 inch automated steering among crop growers", Trimble White Paper, 2006, pp. 1-9, Trimble Agricultural Division, 10355 Westmoor Drive, Suite 100, Westminster, CO 80021.

International Search Report and Written Opinion for PCT/US2007/60726, 8 pages.

* cited by examiner

ROBOTIC VEHICLE CONTROLLER

CROSS REFERENCE TO RELATED APPLICATIONS

This application is a continuation of U.S. application Ser. No. 12/087,963, filed on Jul. 18, 2008, now U.S. Pat. No. 8,239,083, which is a nationalization of PCT Patent application Serial No. PCT/US2007/060726, filed Jan. 18, 2007,the disclosures of which are expressly incorporated herein by reference. PCT Patent application Ser. No. PCT/US2007/060726 claimed priority to U.S. application Ser. No. 11/624,199, filed Jan. 17, 2007, now U.S. Pat. No. 7,953,526, which claimed the benefit of U.S. application Ser. No. 60/760,011, filed on Jan. 18, 2006, the disclosures of which are all expressly incorporated herein by reference.

BACKGROUND AND SUMMARY OF THE INVENTION

The present invention relates to a control system which integrates a machine controller for real time steering of the a machine over a learned path and a GPS or Gyro based monitor for monitoring the precision of the steering and correcting any drift away from the learned path as the machine operates. In an illustrated embodiment an on board controller communicates with other selected machines (such as mowers in the field) such that a plurality of machines operate together to complete a task (such as a plurality of mowers within the same field).

An illustrated embodiment of the present invention includes a control system which integrates a servo machine controller for real time steering of a machine with machine vision, which "sees" previously delivered markers that define the path of travel of the machine and other machine commands encoded within parameters of the marker. Initial markers are illustratively used to define the outer limits of the operating area. The machine will then follow those markers while doing work such as mowing, plowing, planting, etc. As the machine travels, it delivers a new marker path, which defines the next path for the machine to follow. This process continues until the work within the defined area is complete. A specific color or other defining parameter of the markers may illustratively be used to encode various commands to the machine such as the outer limits, follow, turn points, speed changes, pause, shut down, reverse, read compass etc. Each defining parameter in the marker can encode a given command to the controller via the vision system. Some markers can contain more than one parameter difference thus more than one machine command.

Another illustrated embodiment of the present invention includes a control system which integrates a servo machine controller for real time steering of the a machine over a learned path, machine vision which "sees" markers as discussed above, and a GPS based monitor for monitoring the precision of the steering and correcting any drift away from the learned path as the machine operates. The markers are "seen" by the on-board machine vision. The markers are used to encode various commands to the machine such as the outer limits of the field, follow, turn points, speed changes, pause, shut down, reverse, read compass etc. The on board controller also may communicate with other selected machines in the area enabling a team of machines to operate together.

The preferred embodiment of the invention is the integration of the control system with a Zero Turning Radius (ZTR) lawn mower. While the ZTR lawn mower embodiment is described herein, it is understood that other vehicles and machines may include the control systems of the present invention described herein. For example in other embodiments the control system may be used with farm tractors, trucks, bulldozers, utility transports, military vehicles and tanks, other types of mowers, etc. the control systems of the present invention described herein may also be used to guide motor vehicles on the roads or guide boats along desired paths. In the boating application, the boat can be programmed to avoid hidden obstacles in the water by maintaining the boat on the predetermined path.

This control system has wide usage in application where on board operators are used to operate the machine but there is a desire to replace the operator with a robotic machine for reasons such as cost, safety, efficiency, shortage of operators, reliability of operators, harsh impact of the mowing debris on the operator or other variables that impact the overall operation of the machine. In order words, the machine may be operated in both manual and automatic modes.

Basic Operation of a ZTR Mower:

Presently a person must drive the lawn mower to complete the lawn-mowing task in both the commercial and domestic markets. The preferred mower in the both markets is the ZTR mower.

Two hydraulic motors power the ZTR mower, one on each rear driving wheel. Each motor/drive wheel will turn in either CW or CCW direction as the control valve is manually operated by the driver of the mower. Two vertical hand levers, one for each drive wheel, are positioned so the driver of the mower can easily access and operate them directing the hydraulic control valve to route the hydraulic oil which powers the hydraulic motors to turn either CW or CCW at a rate and direction that is controlled by the position of the vertical hand levers. These levers control the direction and speed of the mower.

Robotic ZTR Mower:

The robotic mower is the integration of a multiplicity of sub-systems with a ZTR mower. These sub-systems include: a servo motion controller to control various sections of the mower such as the steering, speed, blades and engine, a vision system used to track ground based command markers, a compass to enable the robot to have directional capability, a GPS system to monitor location, a communication system to receive and send data to other robots or base stations, a computer to store data, store programs and control the entire robotic system, various sensors to measure distances to objects and various mower and engine parameters and a system that delivers ground based command markers.

Basic Operation of a RZTR (Robotic Zero Turning Radius) Mower:

The computer-based controller allows the RZTR of the present invention to be operated in two separate modes. The first mode is the learn mode where the robotic mower either learns a path and stores the path in a computer to be used for future operation of RZTR or deliver(s) ground based markers creating an initial path for immediate use by the RZTR.

The second mode of operation depends upon how the RZTR was programmed. If the RZTR was programmed in the learn mode then any properly equipped RZTR can use this program to operate alone in a field or as a member of a team of RZTR's mowing the field.

If the RZTR initially delivered markers then any properly equipped RZTR can follow the markers while delivering additional tracking markers as the field is being mowed.

The first mode of operation allows the operator to drive the RZTR in a normal manual mode. In this mode the operator can direct the controller to learn and save the path over which the mower is being drive and/or deliver ground based command markers. Each drive wheel has an encoder attached. The mowing path is "learned" by the computer recording the data coming from each encoder. A servo controller is attached to each wheel control valve. In the robotic mode the computer steers the mower by utilizing the stored path data to activate each of the control valves via the servo attached to the valves. This control function will steer the mower over substantially the same learned path stored in the memory of the computer as the operator steered the mower over the original path.

Variables exist in the total system such as tire pressure, roughness of the terrain, slippage of both wheels and other system variables. These variables may result in the mower slowly drifting off the original learned mowing path. This drift may be corrected periodically by utilizing GPS coordinate data or machine vision system data generated by tracking the ground based markers. The stored path data in the computer steers the mower and the GPS monitors the exact location providing means for correcting the drift inherent in the system. The compass is used to set a direction from a random starting point to the beginning of the stored mowing path. The compass may also provide direction information during operation enabling the computer to anticipate major direction changes. The compass may also provide a monitoring function by checking direction of the mower against the learned path.

Basic Operation of a ZTR Robotic Mower Utilizing Machine Vision Path Monitoring:

This system follows a path of targets or visual markers that are delivered from the mower as an operator steers a path around an area of a field that is to be mowed. Once the perimeter is completed the operator switches the mower to robotic mode to complete the mowing of the area. In this mode the mower uses the on board machine vision to find the next target or marker and steer the mower toward that marker. The mower is steered between markers by the same servo control system described above. This process will continue until the encircled area has been mowed.

This robotic mower can also be used to mow a pattern in which the mower reverses direction at each end of the cut and follows the same previous cut, but in the opposite direction. Illustratively, a different colored marker is delivered at the end of the each cut signaling a turn around. This process continues until the entire area is mowed.

In another embodiment, the area to be mowed is encircled delivering a path of turn around markers. When the perimeter is defined in this manner the operator will cut a path along one edge of the area delivering a row of guidance markers then change the mower into the robotic mode preparing the mower to finish mowing the remaining defined area. The mower will follow the guidance markers along the first cut until finding a turn around marker then the mower will turn around reversing direction and follow the guidance markers until finding another turn around marker. This process continues until the area has been completely mowed and the end marker is encountered. In both types of cut patterns an end marker will be planted in the field area such that when this marker is reached the mower shuts down.

In all the above-described mowers proximity sensors or other types of anti-collision sensors such as radar, laser scanners, or RF Antennas, etc. are used to avoid a collision of the mower and other objects.

In an illustrated embodiment of the present invention, a method of moving a machine along a desired path includes operating a machine in a manual mode to traverse the desired path, the machine having at least one drive wheel and a steering wheel, recording control signals to the at least one drive wheel and the steering wheel as the machine traverses the desired path during the manual mode to provide stored path data, detecting GPS location signals at a plurality of locations along the desired path during the manual mode, and storing a plurality of GPS locations which are linked to particular points along the desired path. The method also includes operating the machine in a robotic mode in which the stored path data is used to control the at least one drive wheel and the steering wheel to move the machine along the desired path without operator control, detecting GPS location signals at a plurality of locations along the path traveled by the machine during the robotic mode, comparing the GPS location signals at a plurality of locations along the traveled path during the robotic mode with the corresponding stored GPS locations that were linked to particular points along the desired path during the storing step, and correcting the position of the machine if it is determined that the machine has moved away from the desired path by a predetermined amount based on the comparing step.

In another illustrated embodiment of the present invention, a self-propelled vehicle includes a frame, a plurality of wheels coupled to the frame, and a hydraulic motor supported by the frame. The hydraulic motor is coupled to at least one drive wheel selected from the plurality of wheels to provide power to rotate the at least one drive wheel. The vehicle also includes a hydraulic control valve coupled to the hydraulic motor, and a stepper motor coupled to the hydraulic control valve. The stepper motor is configured to adjust an output from the hydraulic control valve to control the hydraulic motor and adjust the speed and direction of rotation of the at least one drive wheel.

In one illustrated embodiment, the hydraulic control valve includes a rotatable control shaft configured to adjust an output of the hydraulic control valve. The stepper motor is coupled to the control shaft to selectively rotate the control shaft in first and second directions to adjust the speed and direction of the at least one drive wheel.

In yet another illustrated embodiment of the present invention, a method of moving a machine along a desired path includes storing path data indicating a desired path of travel for the machine, storing a plurality of GPS locations linked to particular points along the desired path, automatically moving the machine along the desired path using the stored path data, and detecting GPS location signals at a plurality of locations along the path actually traveled by the machine during the automatically moving step. The method also includes transmitting a GPS reference signal to the machine, determining a corrected GPS location at each of the plurality of locations along the path actually traveled by the machine based on detected GPS location signals and the GPS reference signal, and comparing the corrected GPS location at each of the plurality of locations along the path actually traveled by the machine with the corresponding stored GPS location that was linked to particular points along the desired path. The method further includes correcting the position of the machine if it is determined that the vehicle has moved away from the desired path by a predetermined amount based on the comparing step, and charging a fee based on usage of the GPS reference signal.

In one illustrated embodiment, the method includes transmitting information related to the machine from the machine to a remote computer. The information transmitted from the machine to the remote computer may include identification data for the machine. The remote computer validates the machine based on the identification data and records an amount of time that the validated machine is receives the GPS reference signal.

In still another illustrated embodiment of the present invention, a method of moving at least two machines along a desired path includes storing path data indicating a desired path of travel for the at least two machines, providing at least two machines located at different positions on the desired path, and automatically moving the at least two machines simultaneously to traverse the desired path using the stored path data.

In an illustrated embodiment, a first machine is a master machine and at least one other machine is a slave machine. The master machine may communicate the stored path data to the at least one slave machine. The master machine may also communicates stored GPS locations linked to particular points along the desired path to the at least one slave machine.

In a further illustrated embodiment of the present invention, a method of moving a machine along a desired path includes storing path data indicating a desired path of travel for the machine, storing a plurality of GPS locations linked to particular points along the desired path, automatically moving the machine along the desired path using the stored path data, and detecting GPS locations at a plurality of locations along the path actually traveled by the machine during the automatically moving step within an accuracy of about 30 cm or less without the use of a GPS reference signal to correct the detected GPS location signals. The method further includes comparing the detected GPS location at the plurality of locations along the path actually traveled by the machine with the corresponding stored GPS location that were linked to particular points along the desired path, and correcting the position of the machine if it is determined that the vehicle has moved away from the desired path by a predetermined amount based on the comparing step.

In one illustrated embodiment, the step of detecting GPS locations at a plurality of locations along the path actually traveled by the machine uses a single multi-frequency GPS receiver on the machine. In another illustrated embodiment, the step of detecting GPS locations at a plurality of locations along the path actually traveled by the machine uses a plurality of single frequency GPS receiver on the machine. As discussed above, it is understood that these guidance systems can be implemented on other types of mowers requiring different control system designs but still using the same guidance concepts.

BRIEF DESCRIPTION OF THE DRAWINGS

The detailed description particularly refers to the accompanying figures in which.

DETAILED DESCRIPTION OF THE DRAWINGS

Figure 1:
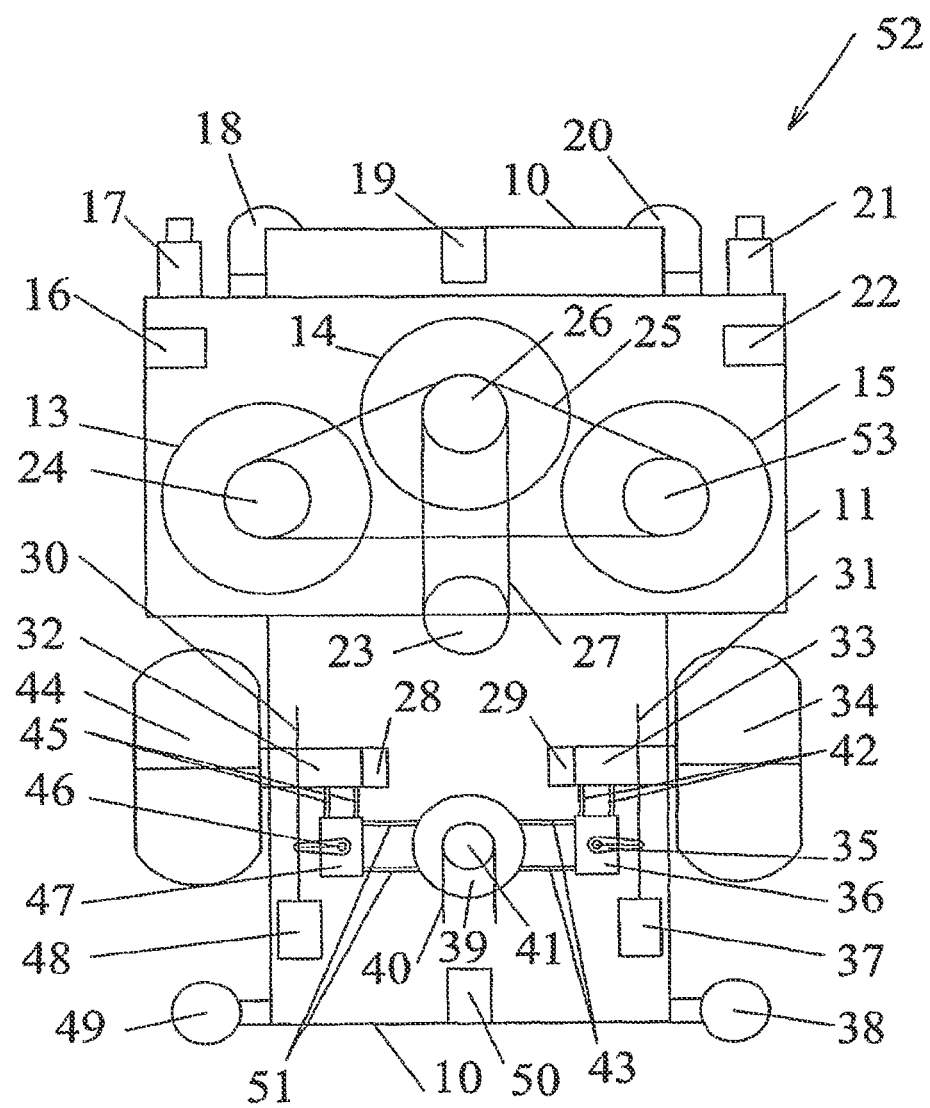
FIG. 1 is a top view of RZTR showing the major mechanical, hydraulic control, electrical and electronic components.

Referring now to the drawings, FIG. 1 illustrates a robotic zero turning radius (RZTR) mower apparatus 52 according to the present invention. The apparatus 52 includes a frame 10 supported on the front by wheels 18 and 20 and on the rear by drive wheels 34 and 44. The front wheels 18 and 20 are swivel mounted. The rear wheels 34 and 44 both support the rear of the frame 10 and provide the drive power for apparatus 52. A mower deck 11 is coupled to frame 10. Mower blades 13, 14, 15 are coupled to deck 11. Blades 13, 14, 15 are driven by belt 25 located on pulleys 24, 26, 53. Electric clutch 23 is selectively driven to rotate belt 27 coupled to pulley 26 to drive the blades 13, 14 15.

Figure 2A:
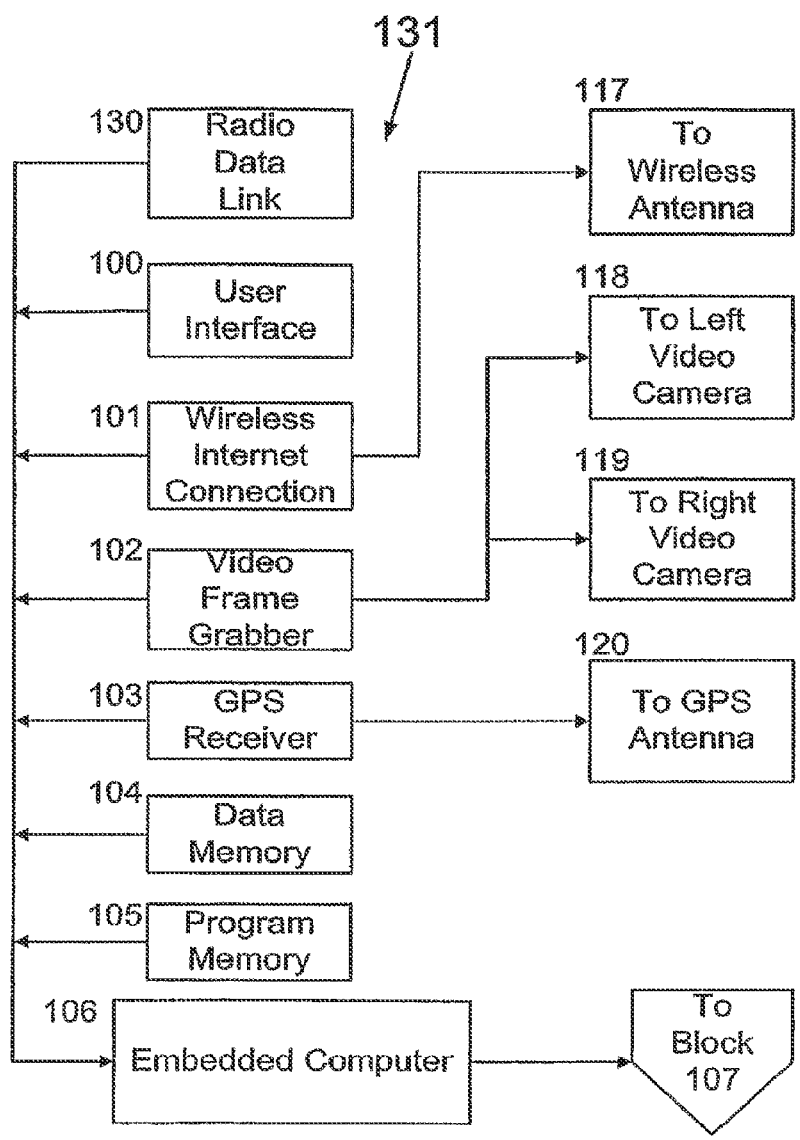
FIGS. 2A-2C are a block diagram of the major components of the RZTR controller.
Figure 2B:
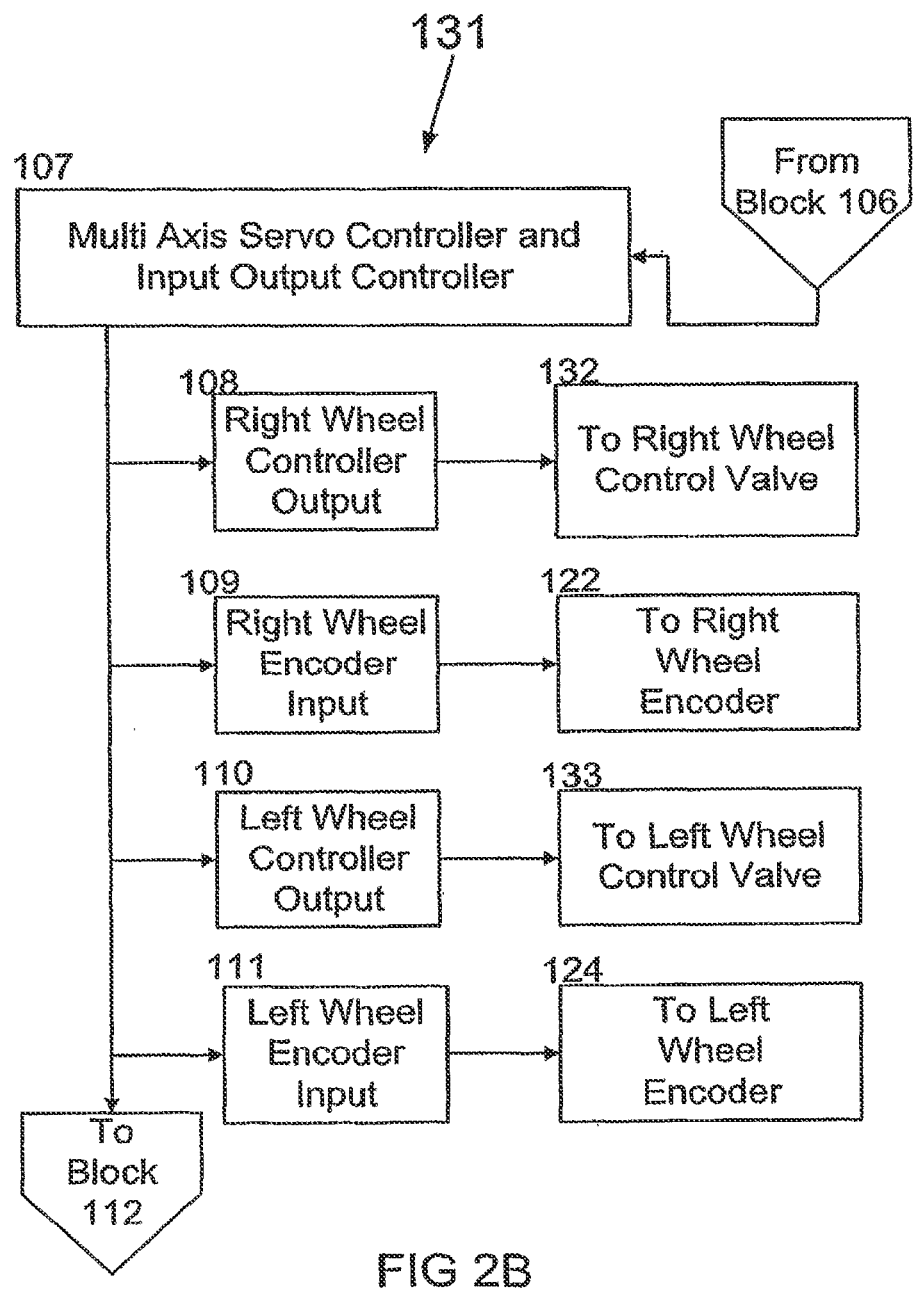
Figure 2C:
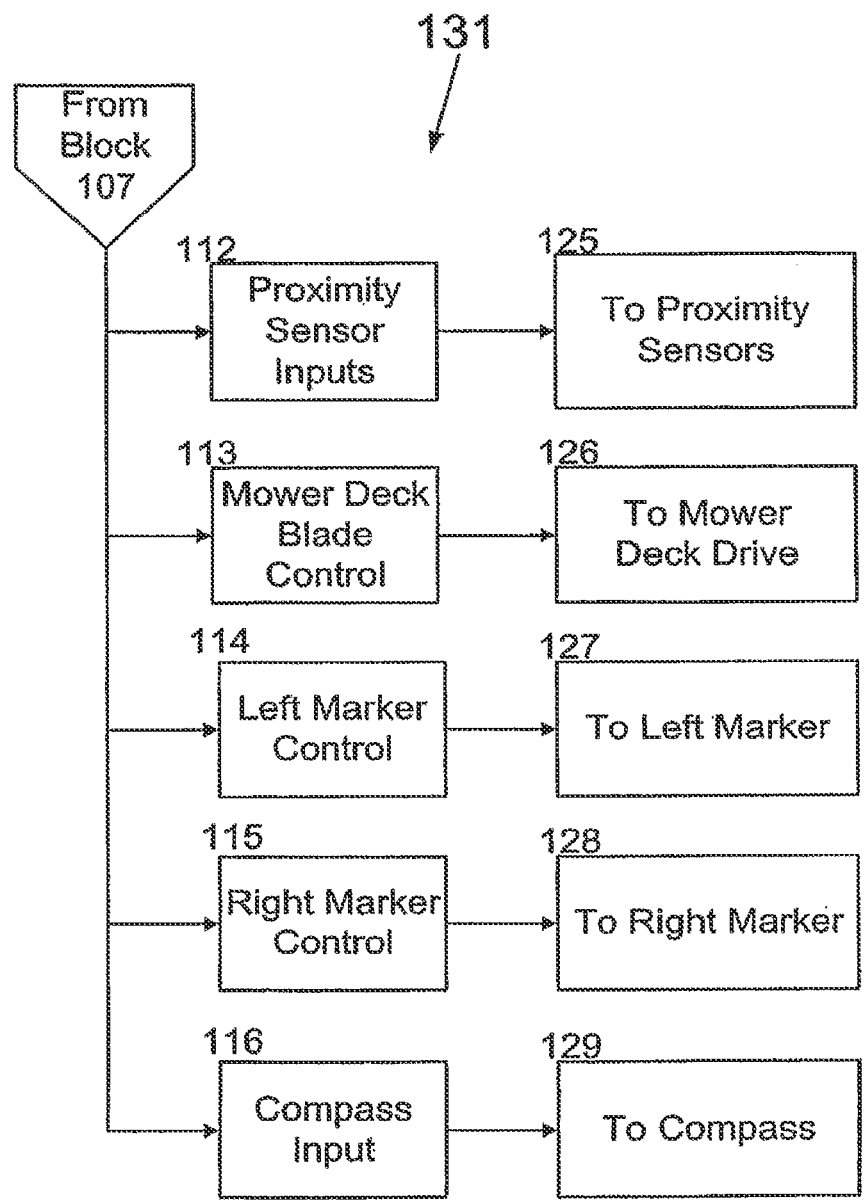

Hydraulic servomotors 32 and 33 provide power to drive wheel 44 and 34 respectively. The speed and direction of rotation of the rear wheels 44 and 34 are controlled by hydraulic control valves 47 and 36, respectively through supply lines 42 and 45, respectively. Control arms 46 and 35 activate hydraulic control valves 47 and 36, respectively. Control arms 46 and 35 are operated both manually via control rods 30 and 31 and automatically by the servo controllers 123 and 121 (see FIGS. 2A-2C) which are connected to the valve drivers 48 and 37, respectively.

The servomotors 123, 121 are illustratively powered by hydraulic oil by servo control valves 36 and 47. Oil pressure is provided by a hydraulic pump 39 driven by pulley 41 and belt 40 which is driven by the on board engine. Pump 39 is coupled to valves 36 and 47 by supply lines 43 and 51, respectively. Each servomotor 32 and 33 has an incremental encoder 28 and 29, respectively, attached. The encoders, 28 and 29 provide a pulse stream, which communicated wheel angular rotational displacement to the servo controller 107 shown in FIG. 2B. Proximity sensors 19, 22, 50 and 16 are strategically located on all sides of the apparatus 52 providing means of communicating the distance between the apparatus 52 and any objects in the immediate proximity of the apparatus. Illustratively, proximity sensors 19, 22, 50 and 16 are machine vision, ultrasonic, infrared vision devices, standard infrared proximity sensors, cameras or other suitable proximity sensors. For instance, a laser scanner 54 (See FIG. 1A) such as SICK model LMS211-30206

Vision sensors such as cameras 17 and 21 are located on the left front and right front of apparatus 52, respectively, to provide means for "seeing" markers located on the terrain in front of the apparatus 52. Marker delivery units 49 and 38 are located on the left rear and right rear, respectively, of the apparatus 52 to provide means for delivering markers as the RZTR travels along the terrain.

In another illustrated embodiment of the RZTR, the manual steering controls as well as the linear actuators which drive the manual steering controls in the robotic mode are replaced with a proportional hydraulic servo control valve connected between the hydraulic pump 39 and the motors 32 and 33.

In yet another illustrated embodiment of the RZTR, the manual steering control valves 36 and 47 remain in the system and a hydraulic proportional servo control valve is connected in parallel with the manual valve. In the learn mode the manual valve controls the motors and in the robotic mode the proportional servo control valve operates the steering of the mower by controlling motors 32 and 33.

In yet another illustrated embodiment of the RZTR, the control shaft where the manual steering control valves 36 and 47 are attached are connected to the output of a gearbox. The input shaft of the gear box is connected to a stepper motor shaft. The stepper motor is controlled and driven by the servo controller in the RCS. In the robotic mode of operation the stored encoder data is presented to the servo controller as reference data and real time encoder data is also presented to the servo controller. The servo controller then adjusts the steering control valves by adjusting the position of the stepper motor which is connected thru a gearbox to the control shaft. The servo controller via this electomechanical system will cause the real time encoder data to match the stored encoder data at which time the wheel speed will be the same as it was when the encoder data was stored during a learn mode of the RZTR. The control is maintained for both drive wheels and by so doing the mower will follow the same path as programmed in the learn mode.

An accelerometer may be used during run mode to monitor the amount of bouncing the mower is doing so the speed can be slowed thus reduce the loss of traction of the tires with the turf, which results in position errors.

FIGS. 2A-2F illustrate a robotic control system (RCS) 131 which when combined with the apparatus 52 results in a robotic zero turning radius (RZTR) mower. The RCS central control is illustratively an embedded computer 106 which provides program control for the entire RZTR. The embedded computer 106 has attached program memory 105 and data memory 104 providing means for electronic storage of coded information which can be decoded and executed by the embedded computer orchestrating the operation of the RCS 131. The data memory 104 provides means for electronic storage of variables, collected data and various random data utilized by the RCS 131 to direct the operation of the entire RZTR mower.

Figure 1A:
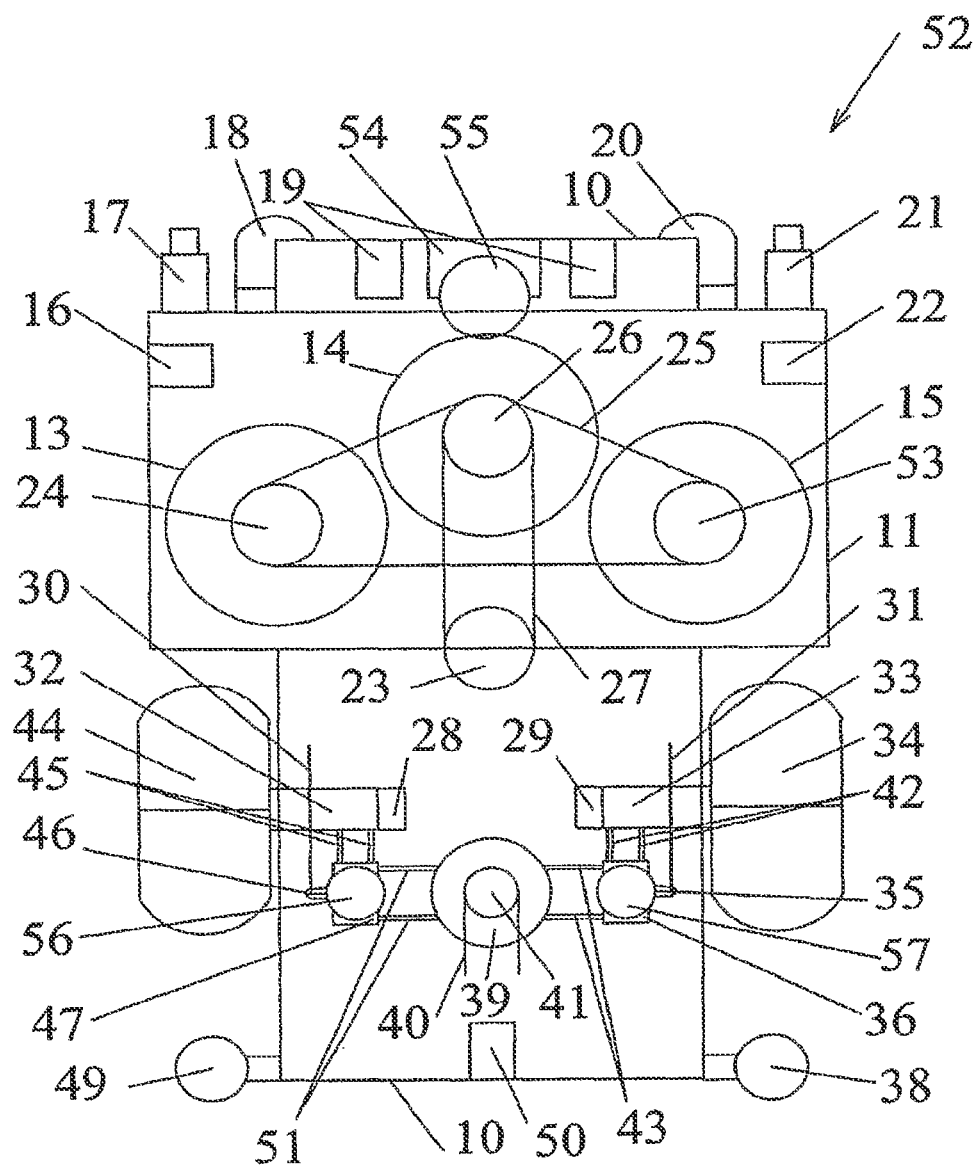
FIG. 1A is a top view of RZTR showing the major mechanical, hydraulic control, electrical and electronic components including a GPS antenna and stepper drivers for hydraulic control.

A GPS receiver 103 is attached to the embedded computer providing location data so the RCS can learn or monitor the location of the RZTR as it travels over the terrain. Illustratively, GPS receiver 103 is coupled by a connector 120 to a GPS antenna 55 on frame 10 as shown in FIG. 1A.

The on board GPS receiver 103 receives reference GPS data from a base station GPS receiver located up to several miles from the location of the mower. The data from the on board GPS receiver and the base station receiver is processed by on board RTK (Real Time Kinematic) software utilizing sophisticated data process techniques to generate high accurate longitude and latitude numbers. Accurate to about one cm. The base station reference data can be generated by a single GPS receiver fixed to the earth at a known location. This station is typically within about 3 to about 20 miles of the mower in order for the RTK software to generate location data accurate to about one cm.

An Intelligent Virtual RTK Network (IVRTKN) can be used to generate the base station reference data offering a number of functional improvements and cost reductions in mower or other rover application. The IVRTKN is made up of a network of fixed physical GPS base stations positioned in a grid array. Each station communicates data to a host computer in real time. This data is processed using algorithms which incorporate variables whose values are impacted by satellites relative location, atmospheric and ionospheric conditions and other pertinent variables that impact the quality and accuracy of received GPS data. This intelligent algorithm generates a virtual GPS base station data plane. Since the IVRTKN is intelligent a unique longitude and latitude value is calculated using the algorithm for the specific location of the user (mower).

This system has many improvements over the old system of each user having an associated base station. They are:

1 More robust data using multi-physical base stations. If one physical base station fails the IVRTKN will continue to deliver reference data to the users.

2. Elimination of orbit bias

3. Elimination of ionospheric delays

4. Reduction of troposphere, multipath and observation noise

5. The medium range of RTK operation is extended up to 60 miles which means the physical base station can be up to 100 miles apart.

6. Very high longitude and latitude accuracy can be achieved using low cost GPS receivers 7. System accuracies can be monitored at various points in the network and this feedback data used to further improve the accuracy and robustness of the network output data.

8. The system is much lower cost since the proximity of physical satellite receiver can be larger thus reducing the population of hardware and low cost single frequency receiver can be used.

9. The system is very user friendly since the reference data is available across the coverage area via the Internet thus replacing the need to set up a physical GPS base station at the user work area each time the user executes a task requiring accurate GPS reference position data. With this system the only requirement is an Internet connection for accessing the IVRTKN data.

The IVRTKN data is also available to other users via the Internet or other communication systems for use in any GPS application.

Vision system sensors, cameras or other similar sensors 17 and 21 are located on the front of the apparatus 52 to provide image information about the terrain ahead of the sensors 17 and 21. Sensors 17 and 21 are coupled to a video frame grabber 102 by connectors 118 and 119, respectively. Previously delivered markers are detectable and these images provide the RCS 131 with steering information for the apparatus 52 as it moves over the terrain.

A wireless Internet connection 101 and a local radio receiver 130 are attached to the embedded computer 106 providing a data link to a base station or other command stations. Wireless Internet connection 101 is coupled to an antenna through connector 117. Correction data for the GPS receiver 103 is communicated over these connections as discussed in more detail below. A user interface 100 is attached to the embedded computer to provide means for the operator to communicate with the RCS.

A multi-axis servo controller 107 is attached to the embedded computer 106. This is the control center for the RCS 131. RCS 131 provides servo control for the left wheel 44 via the left wheel controller output 110, the left wheel control valve connection 123, the left wheel control valve drive 48, left wheel control valve 47 and finally to the left wheel servomotor 32. The left servomotor encoder 28 is connected by left wheel encoder connection 124 to left wheel encoder input 111 and finally to the multi-axis servo controller 107 to provide feedback from the left wheel servomotor 32.

The RCS 131 provides servo control for the right wheel 34 via the right wheel controller output 108, the right wheel control valve connection 121, the right wheel control valve drive 37, the right wheel control valve 35 and finally to the right wheel servomotor 33. The right servomotor encoder 29 is connected by right wheel encoder connection 122 to right wheel encoder input 109 and finally to the multi-axis servo controller 107 to provide feedback from the right wheel servomotor 33.

The RCS 131 receives additional data via the multi axis servo controller 107 from a compass connected via connector 129, compass input 116, controller 107 and finally to the embedded computer 106. The compass provides directional information to the RCS 131 enabling the RZTR to move toward the starting point of a learned path from a random location as also to orient the RZTR correctly when it reaches the starting point.

The RCS 131 controls the power to the mower deck blades 13,14,15 by an output from the servo controller 107 via the mower deck blade control 113 connected via mower deck drive 126 to the electric clutch 23 located on the apparatus 52. This provides means for the RCS 131 to turn the mower blades 13, 14, 15 on and off as needed.

The RCS 131 receives proximity data from several sensors 19, 22, 50 and 16 located on the apparatus 52 via proximity sensor connections 125 to the proximity sensor inputs 112. Inputs 112 are coupled via the servo controller 107 to the embedded computer 106. These sensors 19, 22, 50, 16 are monitored during run time providing the RZTR "eyes to see" objects that may be in the pathway of the RZTR allowing the RZTR to take evasive action such steering around the object, slowing travel speed or stopping.

The RCS 131 controls the delivery of markers by the left marker unit 49 and the connection 127 and the left marker control 114 connected to the servo controller 107. RCS 131 also controls delivery of markers by the right marker delivery unit 38 via the connection 128 and the left marker control 115 connected to the servo controller 107. Marker delivery units 38 and 49 are illustratively located adjacent the rear of the apparatus 52. These marker delivery units 38, 49 provide means for the RZTR to leave a trail on the terrain during a cutting pass so on the next pass the RZTR can follow the marker trail using the vision system 102, 118, 119, 17 and 21.

Using this control system the operator will drive the RZTR cutting an outer perimeter path and at the same time delivering a marker on the terrain which the RZTR can follow in a robotic mode of operation. The RZTR will continue to follow the marker path and mowing until the end is reached. The RZTR can deliver a different marker that will signal the RZTR to execute a turn around then follow the marker trail until it reaches another turn around marker. This process is continued until the complete field is mowed and the RZTR finds a stop marker. These examples demonstrate some ways the marker system can be used to define a path for the RZTR to follow.

Any suitable markers may be used in accordance with the present invention. In an illustrated embodiment, marker delivery units 38 and 49 deliver foam "balls" at selected intervals. The foam is colored to provide contrast so that it is visible by cameras 17, 21. In another embodiment, a laser system can be used to heat the ground and an infrared sensor is used to detect the trace.

Illustratively, marker delivery units 38 and 49 may be Peacock foam marking systems available from LEGAULT MANUFACTURING LTD. located in Swift Current, Saskatchewan Canada. The foam is illustratively supplied in pre-mixed and pre-pressurized tanks. The units 38 and 49 dispense a 'strip' of foam at any desired lengths and spacing distances between marks. In another embodiment, TruMark® athletic field marking equipment available from Tru Mark Athletic Field Marker located in Norfolk, Nebr. may be used to spray the foam.

Figure 3:
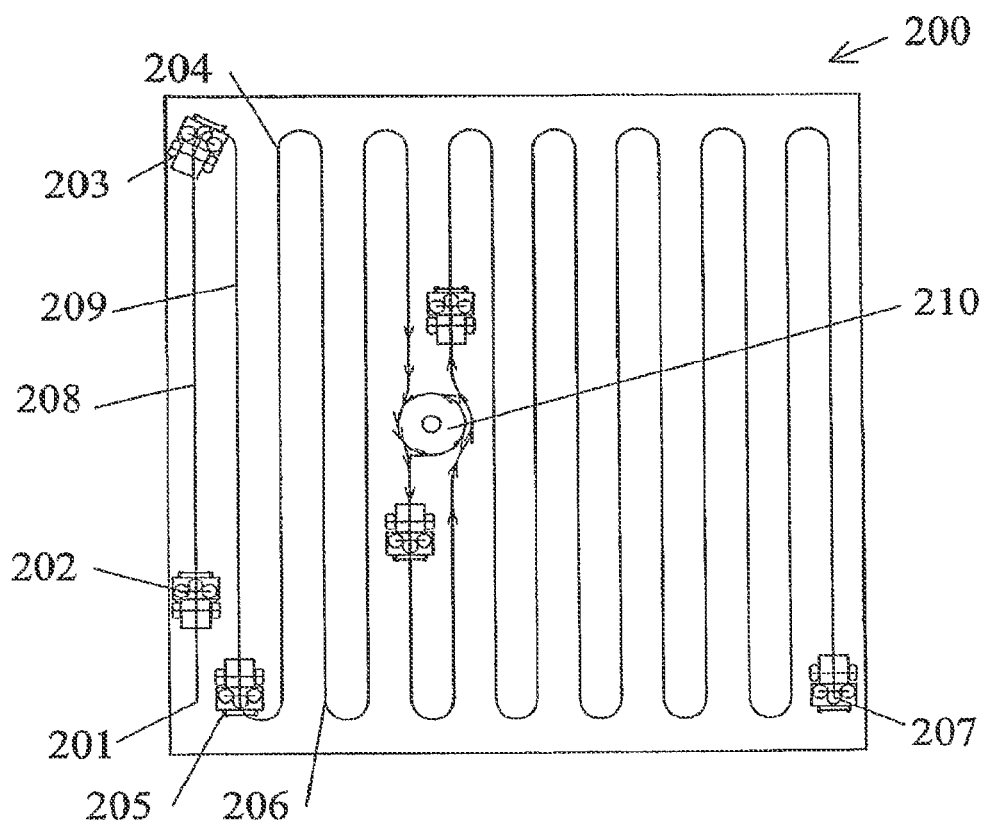
FIG. 3 is a drawing of the RZTR operating in the LEARN mode.

FIG. 3 illustrates a RZTR mower operating in the learn mode in a field 200. The learn task begins with the RZTR at location 201 under operator control. As the operator drives the RZTR along the path 208 as illustrated at location 202, the controller records data from the encoder 28 and 29 on both mower drive wheels 44 and 34 along with GPS reading taken by the GPS receiver 103. When the operator arrives at position 203 requiring the mower to be make a 180 degree right turn the operator may choose to execute the turn manually or use the Right Turn 180 button 1413 on the control panel discussed below. If the Right Turn 180 button is used, the controller automatically operates the RZTR mower to execute the turn so that the path is precisely aligned. Once the turn is completed the operator can chose to continue to steer the RZTR on path 209 or let the controller steer the RZTR using the data collected while executing path 208. This process continues with the operator deciding how the execute turns 205, 204, 206 and ongoing until the tree 210 is encountered. At this point the operator steers a path around the tree 210 and continue on executing the remainder of the turns and paths until the field is complete and the mower has arrived at end location 207. At that time, the operator selects the END 1421 button on the control panel which causes the controller to save the defined or learned path in memory under the client name. This stored path is now ready to for the RZTR to use this path in a robotic manner as discussed below.

Figure 4:
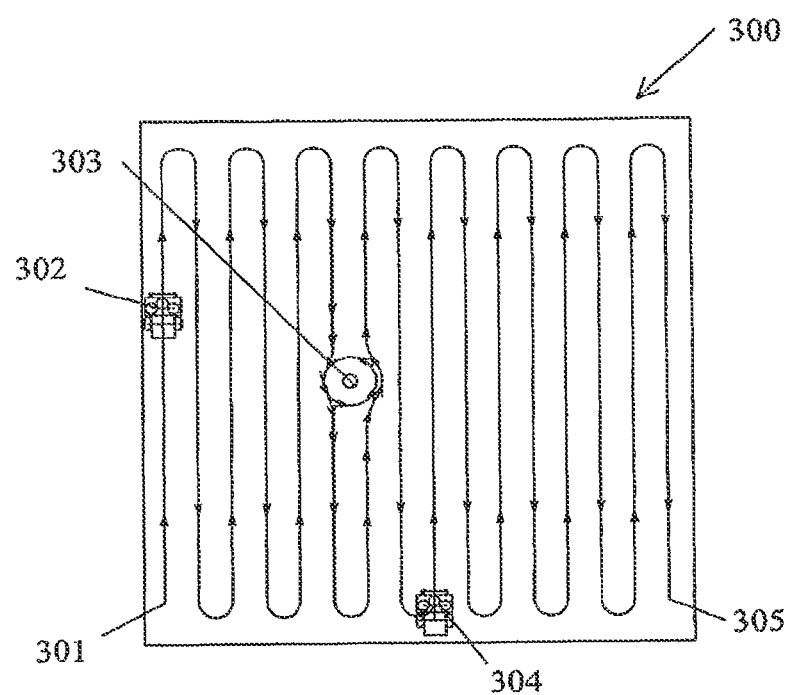
FIG. 4 is a drawing of two RZTR's in the same field, operating as a team, executing a learned path.

FIG. 4 illustrates two RZTR mowers 302, 304 operating in the robotic team mode in a field 300. Mower 302 started at location 301 while mower 304 started at location 304. Both RZTR's are executing the same stored program path but starting at different points within that stored path. RZTR 302 is operating in the Master Mode as selected using button 1625 on the control panel and RZTR 304 is operating in the Slave Mode as selected using buttons 1624, 1623 or 1622 of the control panel. If the slave RZTR 304 does not contain the stored program selected on the Master RZTR 302 then RZTR 304 will request that the program be transferred from RZTR 302 to RZTR 304. Both RZTR's 302 and 304 will execute the programmed path, RZTR 302 will execute the path up to the location where RZTR 304 started and then stop at that point since its task is complete. RZTR 302 follows the programmed path around tree 303 as illustrated in FIG. 4. RZTR 304 will complete the program path ending at location 305. For example, if the first mower 302 starts at the beginning of the selected pattern and the second mower 304 starts 65% through the pattern, at the time the second mower 304 is started a signal is sent from the second mower 304 to the first mower 302 communicating the starting position of the second mower 304 so the first mower 302 will stop when that position has been reached.

Figure 5:
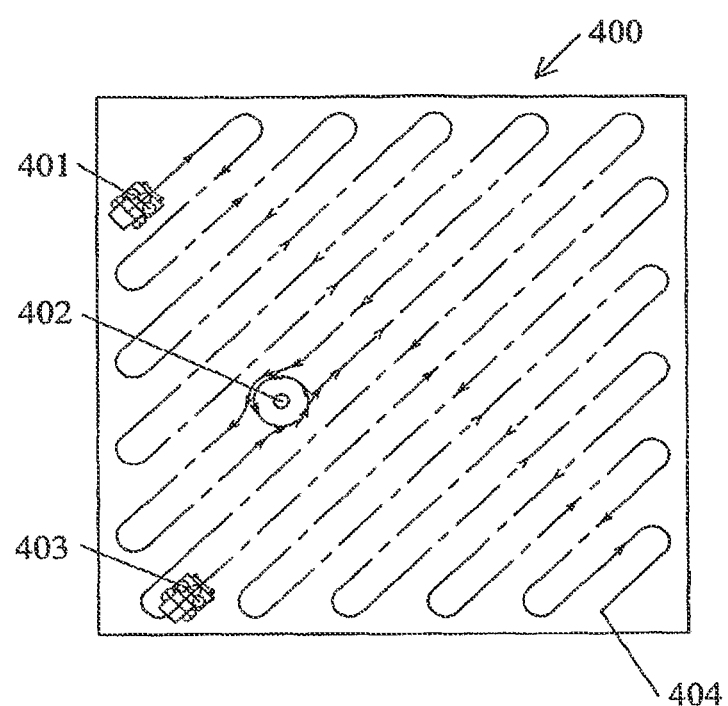
FIG. 5 is a drawing of two RZTR's in the same field executing a learned path at a 45 degree angle from the original path.

FIG. 5 illustrates two RZTR mowers 401, and 403 operating in the robotic team mode in field 400. In this case RZTR mowers 401 and 403 are operating as described above with the added selection of mowing at a 45-degree angle. Selecting "Right 45" in the button group 1620 of FIG. 16 controls RZTR to mow in the 45-degree angle pattern. This selection is available so that tire tracks do not become more visible in the field by the RZTR following the same path mowing after mowing. Mower 401 will retrace the path until it reaches the starting point of mower 403. Mower 403 will follow the path to the end. Mower 401 follows a programmed path around tree 402. It is understood that a single mower could also be used in the 45 degree angle path mode illustrated in FIG. 5.

By rotating the entire mowing pattern as shown in FIG. 5, the appearance of the turf is improved by preventing mower tracks being formed in a field as repetitive mowing occurs. Once a mowing pattern is learned, a digital map of the field exists and is stored. When the map rotation occurs the original digital map is reprocessed with a software program that rotates the pattern creating a new digital map in which the pattern has been rotated by the angular displacement selected. The start and stop location are relocated as needed to fit the rotated image into the field. As illustrated in FIG. 5, since the pattern in this example is rotated 45 degrees clockwise the lengths of the straight sections vary as the pattern moves away from the start point and moves toward the center of the field.

Figure 6:
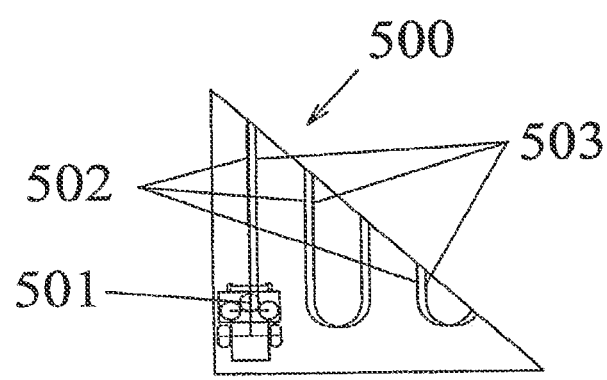
FIG. 6 is a drawing illustrating the application of the mower offset which redress tire tracks caused by repeated mowing in the same path.

FIG. 6 illustrates how the path of the RZTR can be offset each time the field 500 is mowed by selecting the amount of offset using button group 1611 to choose offsets of 0, 4, 6, 8, 10, 12 or 14 inches. This feature reduces the likelihood that tire tracks will be repeated in exactly the same location each time the field is mowed. Offset paths 502 and 503 are illustrated for mower 501. Once the controller stores the precise learned path, the path can be shifted to provide the desired offsets.

Figure 7:
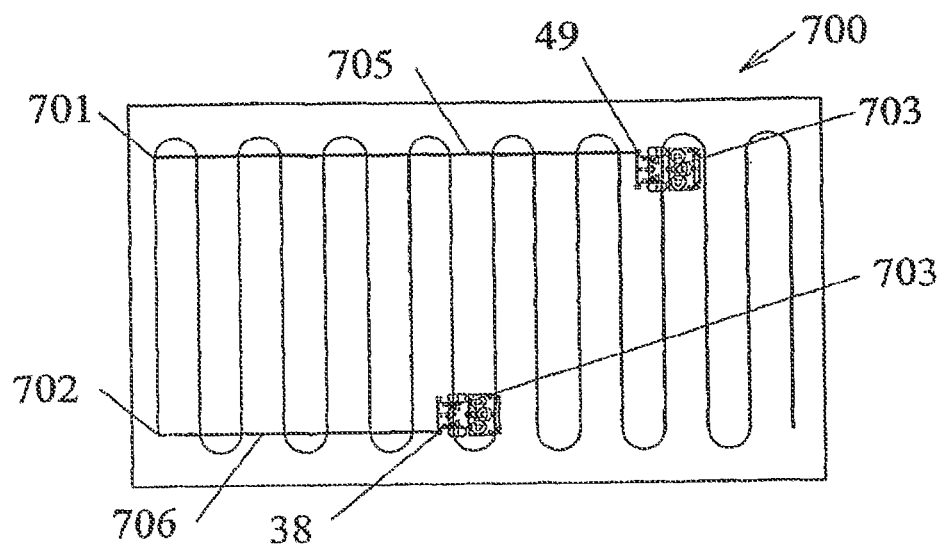
FIG. 7 is a drawing showing application of limit markers in a field.

FIG. 7 illustrates an application of the RZTR where a marker system is being used in field 700. RZTR 703 starts at location 701 delivering trace 705. The trace is delivered by the left marker delivery device 49 which is turned on by button 1208 an off by button 1210 in FIG. 12. The RZTR 703 then delivers trace 706 starting at 702 by using the right marker delivery device 38, which is turned on by button 1214 and off by button 1215. This action places marker traces 705, 706 across the two ends of the field 700 that is to be mowed. An operator is driving the RZTR 703 in the manual mode during this operation.

Figure 8:
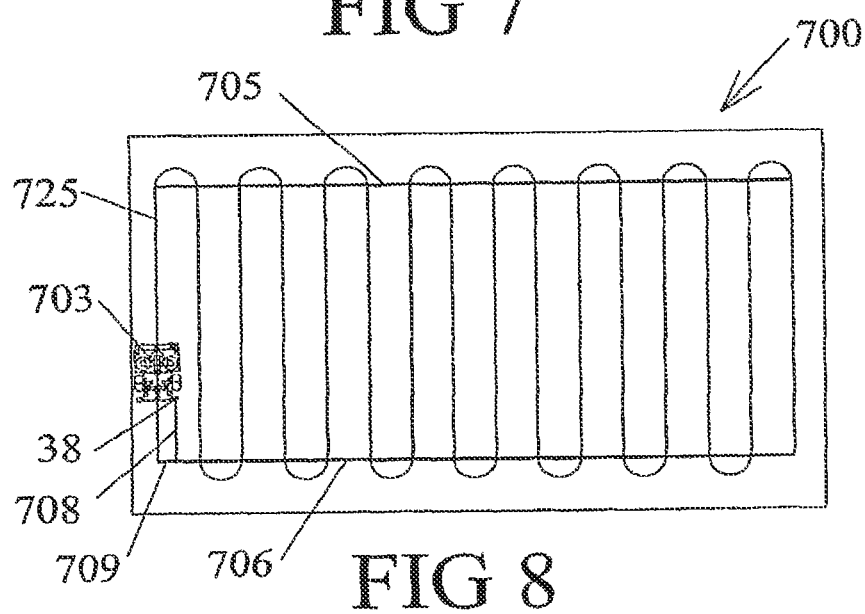
FIG. 8 is a drawing showing a mower using the limit markers while mowing the field while delivering track markers.

FIG. 8 illustrates an application of the RZTR 703 where the marker system is being used. RZTR 703 starts at location 709 and moves along path 725 delivering trace 708. The trace 708 is delivered by the right marker delivery device 38 which is turned on by button 1213 an off by button 1215. An operator is still driving the RZTR 703 in the manual mode during this operation.

Figure 9:
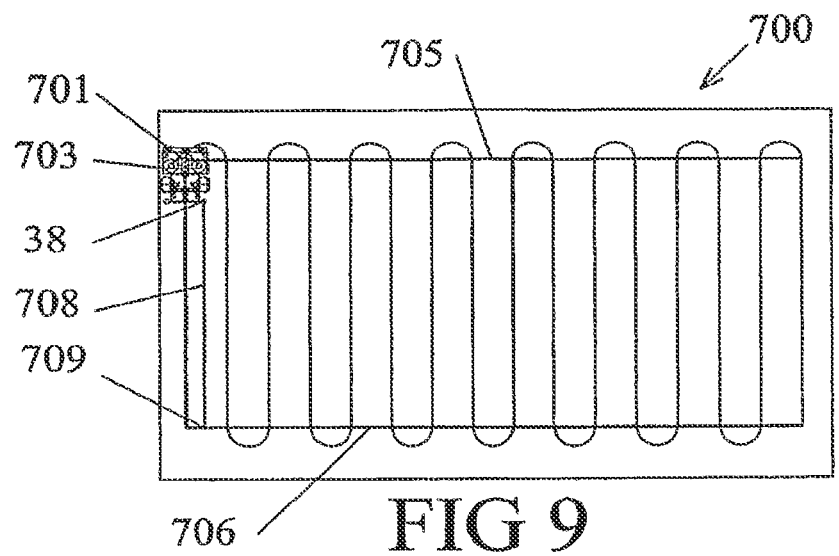
FIG. 9 is a drawing illustrating a mower completing the first pass in a field executing a right 180 degree turn while delivering a track marker for the next pass.
Figure 12:
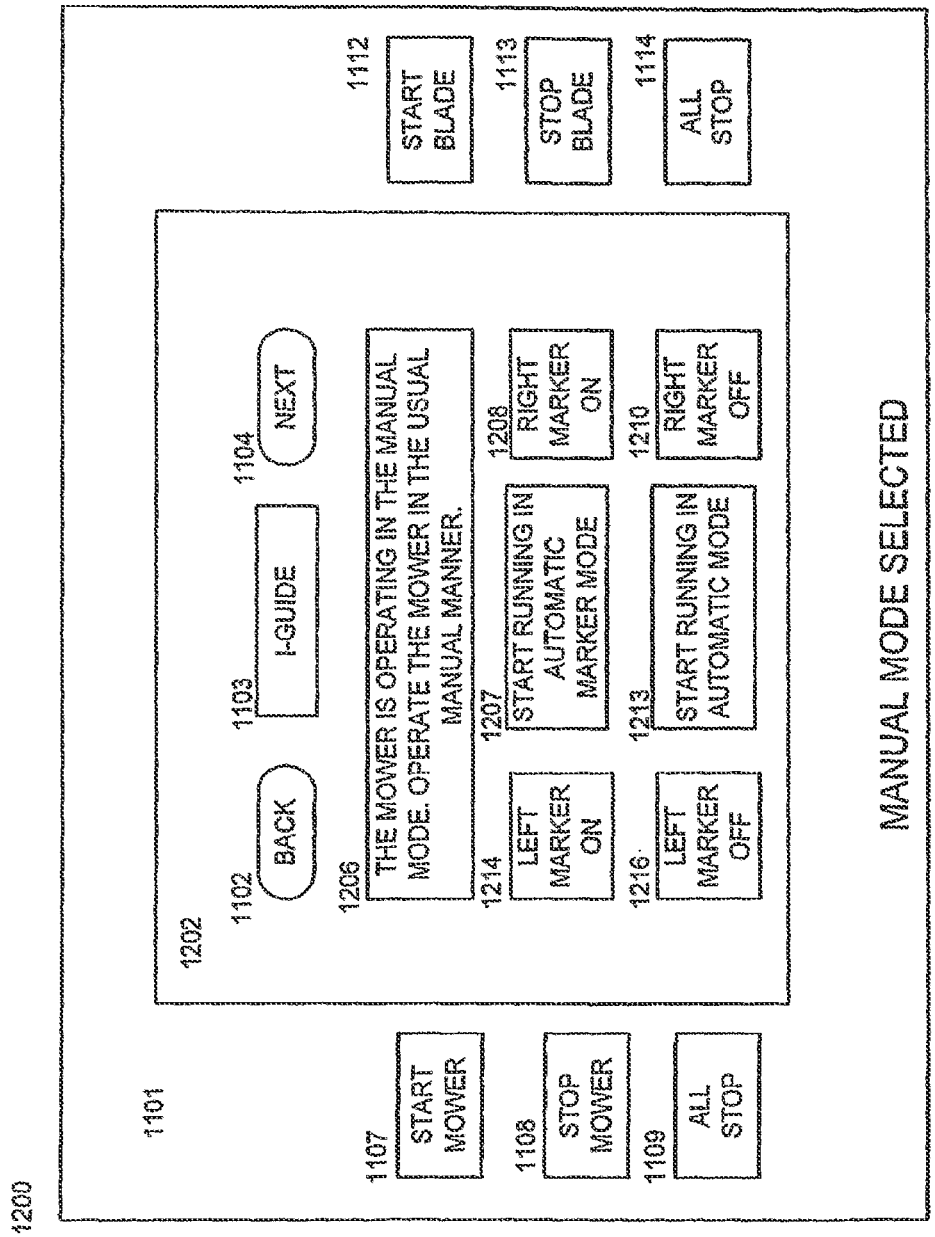
FIG. 12 is a drawing of the operator's control panel where the manual mode has been selected.

FIG. 9 illustrates when RZTR 703 reaches marker trace 705 at which time the RZTR is places in the robotic trace mode of operation by the operator pressing the "START RUNNING IN AUTOMATIC MARKER MODE" button 1207 in FIG. 12. The operator then exits the RZTR 703 and press the remote control start button 1207. The RZTR 703 then executes a right turn 180 degrees, and finds trace 708 using the vision control system sensor 21.

Figure 10:
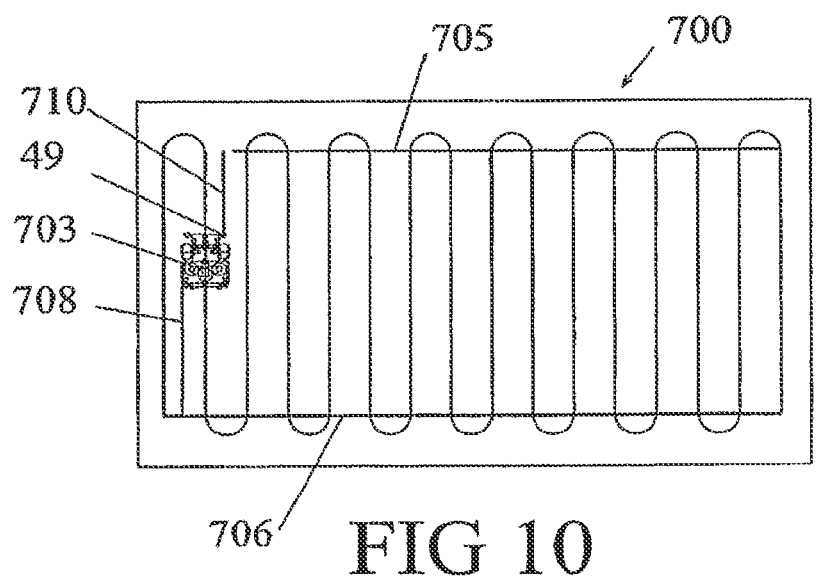
FIG. 10 is a drawing illustrating a mower operating in a robotic mode following a marker path while delivering the next marker path.

FIG. 10 illustrates that the RZTR 703 finds trace 708 using the vision control sensor 21 while activating the left marker delivery system device 49 and delivering trace 710. The RZTR 703 continues to follow trace 708 until reaching trace 706 at which time the RZTR 703 executes a 180 degree left turn finding trace 710 and proceed to follow the trace 710 back toward trace 705. This process of following and delivering traces while mowing the terrain is repeated until the field is mowed.

Figure 11:
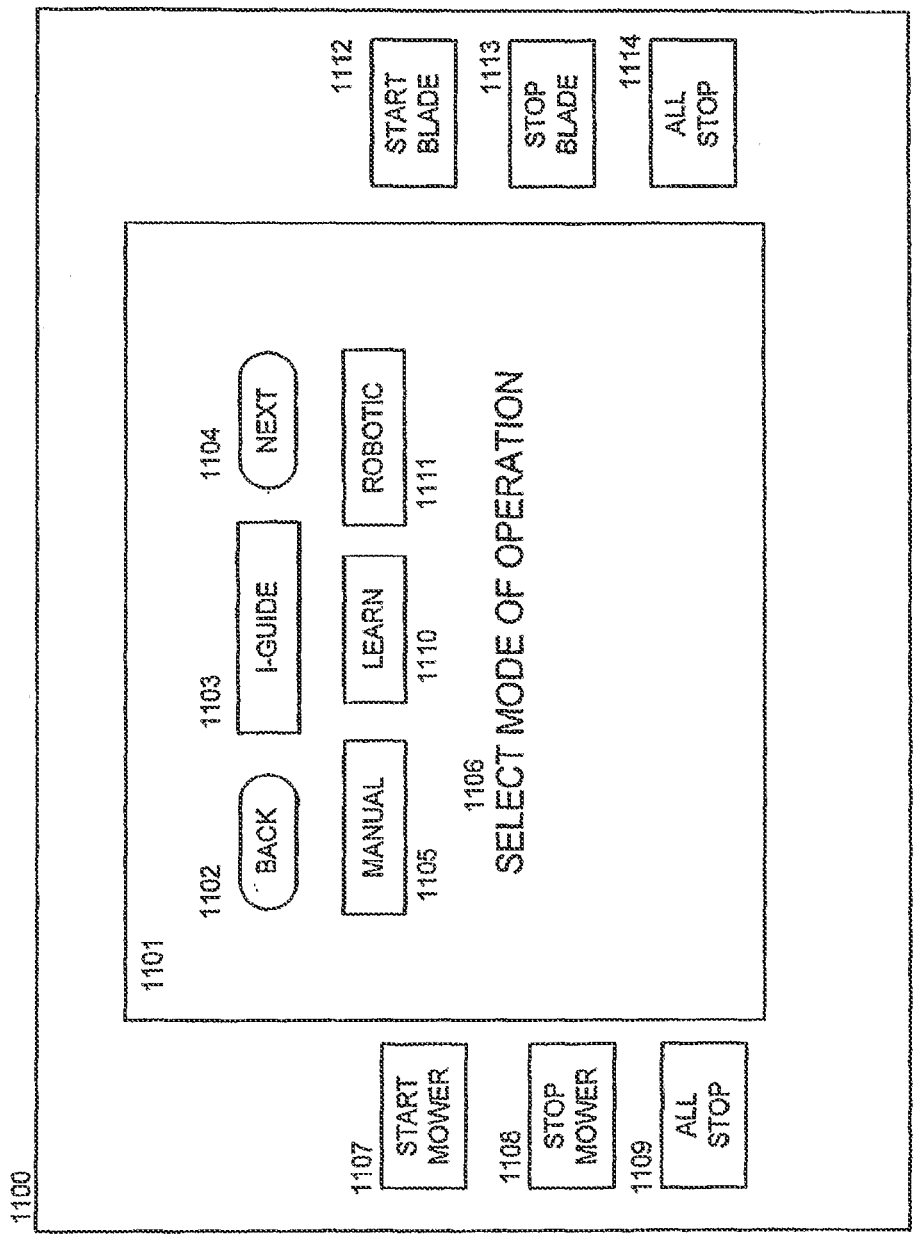
FIG. 11 is a drawing of the operator's control panel in the initial state ready for the operator to select the next operation.

FIG. 11 illustrates an operation interactive control panel 1100. FIG. 11 is illustratively the HOME screen which appears when the RZTR power is turned on. The panel 1100 has mechanical control buttons 1107, 1108, 1109, 1112, 1113, 1114 located along either edge of the panel. Buttons 1107 and 1108 are used for on/off control of the mower engine. Buttons 1112 and 1113 are used for on/off control of the mower blades 13, 14, 15. Buttons 1109 and 1114 when pressed will shut down the entire mower including both the engine and blades 13, 14, 15.

In the center of the panel 1100 is located a flat computer touch screen 1101 connected to the embedded computer 106. This touch screen 1101 is used by the operator to communicate interactively with the embedded computer 106. This illustrative HOME screen contains the name of the system I-GUIDE 1103, a BACK button 1102, a NEXT button 1104, a MANUAL button 1105, a LEARN button 1110 and a ROBOTIC button 1111. Messages 1106 are displayed on screen 1101.

When the MANUAL button 1105 is pressed the computer will switch to the manual operation display illustrated in FIG. 12. When the LEARN button 1110 is pressed the computer 106 switches to the learn mode of operation display 1300 shown in FIG. 13. When the ROBOTIC button 1111 is pressed the computer 106 switches to the robotic mode of operation display 1500 illustrated in FIG. 15.

FIG. 12 illustrates the operations on interactive control panel 1200 during the manual operation of the RZTR. Message 1206 communicates to the operator the RZTR is ready to operate just as any other manual ZTR mower. Buttons 1214, 1216, 1207, 1208, 1210 and 1213 are used to operate in the semi automatic marker mode. In this mode of operation while driving the mower the operator can deliver trace marker using buttons 1214, 1216, 1208 and 1210 as described with reference to FIGS. 7, 8, 9 and 10 above. Once the edge and the initial path marker is delivered the operator can press button 1207 which places the RZTR in an automatic mode of operation. The operator will then exit the mower then press the remote control start button at which time the RZTR will begin following the reference traces until the entire field is mowed. This is described in detail with reference to FIGS. 8, 9, and 10.

Figure 13:
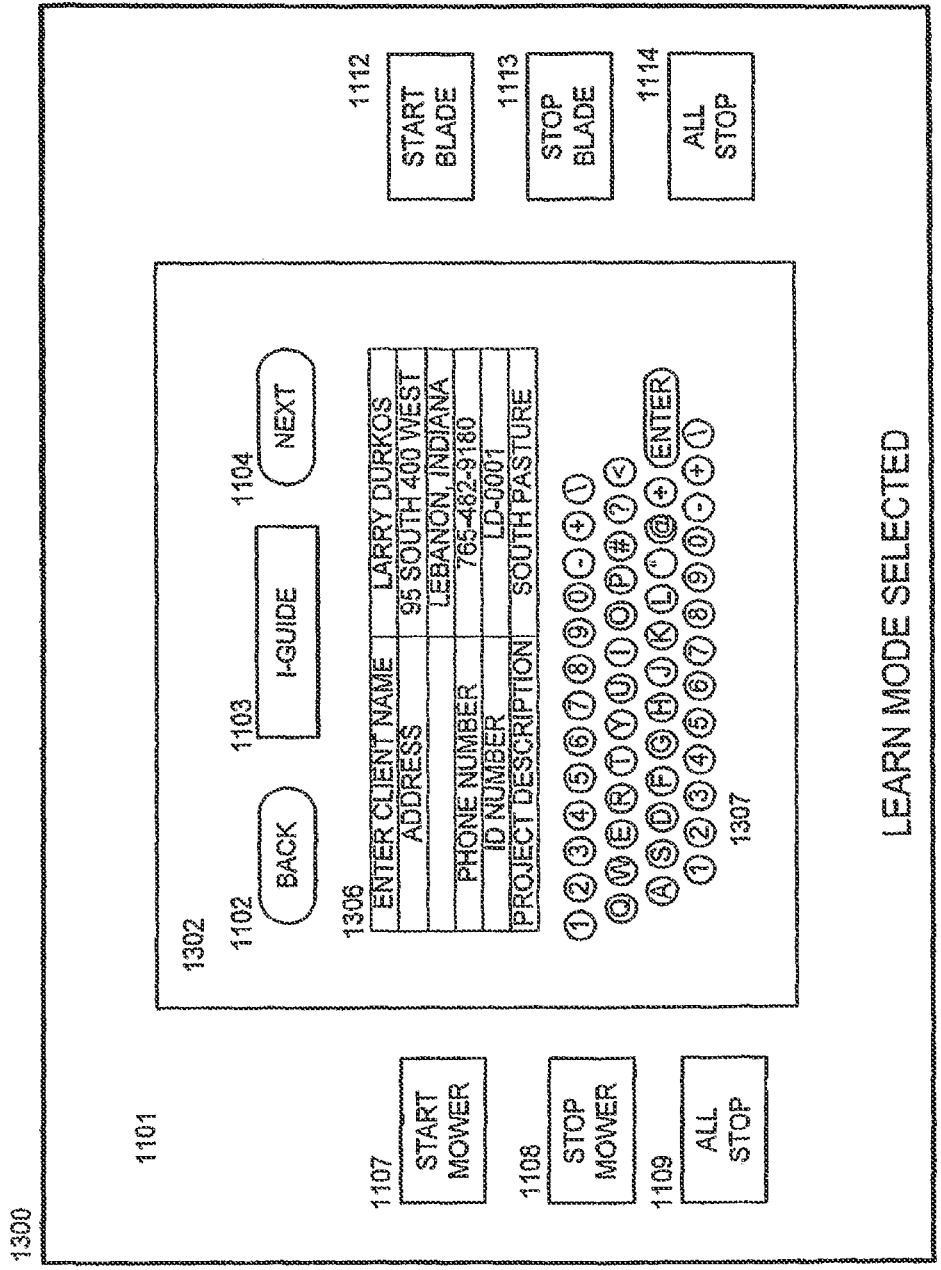
FIG. 13 is a drawing of the operator's control panel where the learn mode has been selected and is prompting the operator to input client data.

FIG. 13 illustrates the operations of the interactive control panel 1300 when the LEARN mode is selected by pressing button 1110 in FIG. 11. This LEARN mode display 1300 provides the operator means for entering data about the client and project. The client's name, address, phone number, project and project description are entered into the display 1306 using the keyboard 1307. When the entry is complete the operator presses the NEXT button 1105 which will switch to display FIG. 14 for additional LEARN mode setup.

Figure 14:
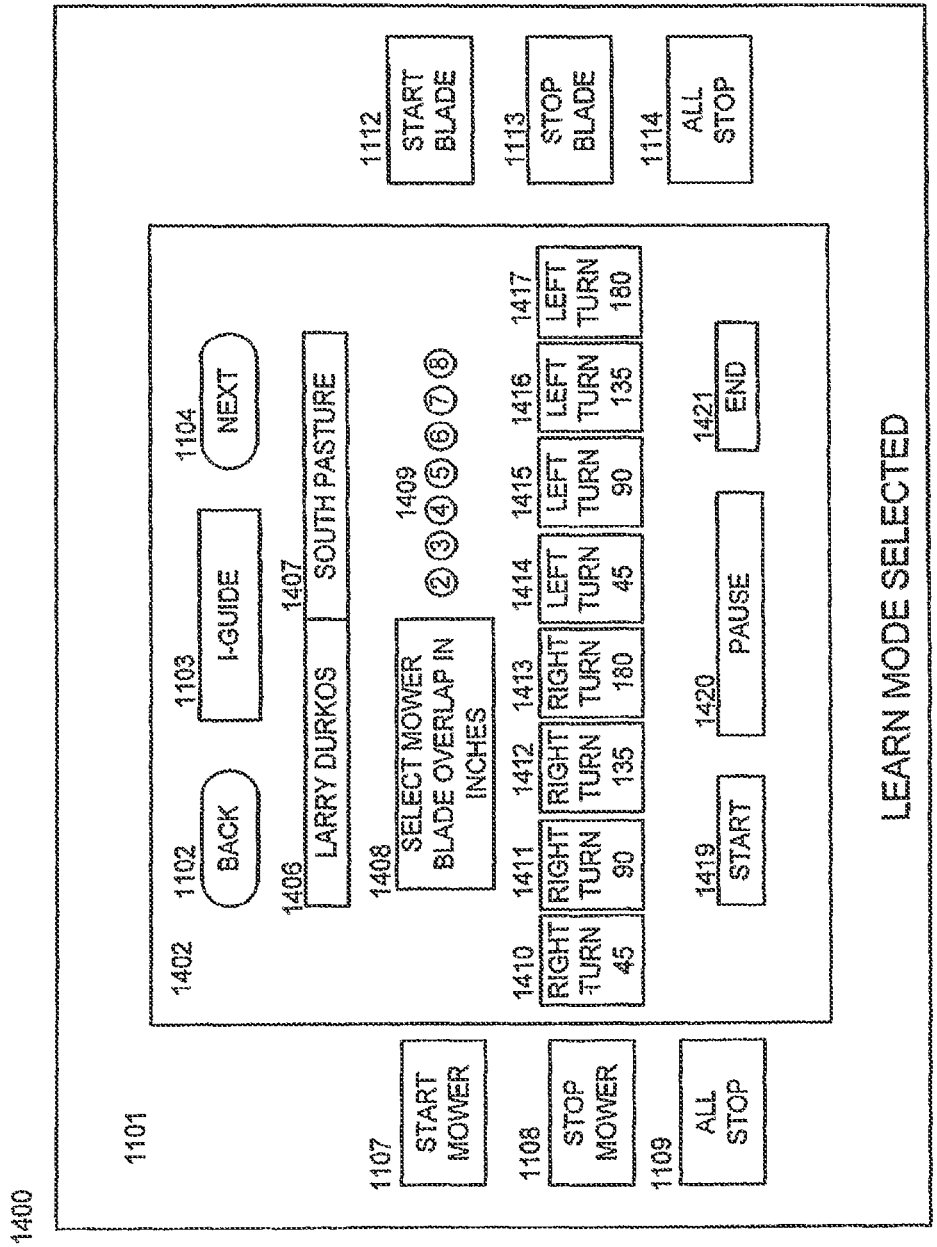
FIG. 14 is a drawing of the operator's control panel where the learn mode has been selected and is prompting the operator to make parameter selection concerning the learning task.

FIG. 14 illustrates the operations of the interactive control panel 1400. This LEARN mode display provides the operator a means of entering additional data about the client and project. The client's name and a project description are displayed on lines 1406 and 1407. The amount of mower blade overlap is selected using the message 1408 and buttons 1409. Once this data is entered and the mower is positioned at a starting point of the path, the operator presses START button 1419 which initialize(s) the computer 106 to begin learning the path over which the operator drives the RZTR. The operator may steer the RZTR over the entire field or may use the turn buttons 1410-1417 to assist executing turns that have been preprogrammed into the RZTR. These pre-programmed turns of different angles are designed to minimize any tire damage to the turf during the turn and also complete the turn with the selected blade overlap.

At any time during the learn operation the operator can press the PAUSE button 1420 which suspends the learn mode until the PAUSE button is pressed a second time. Once the learn path is completed, the operator presses the END button 1421 at which time the entire path is saved in the computer data memory 104. This program or learned path can be passed to other mowers as needed to implement a team mowing project.

Figure 15:
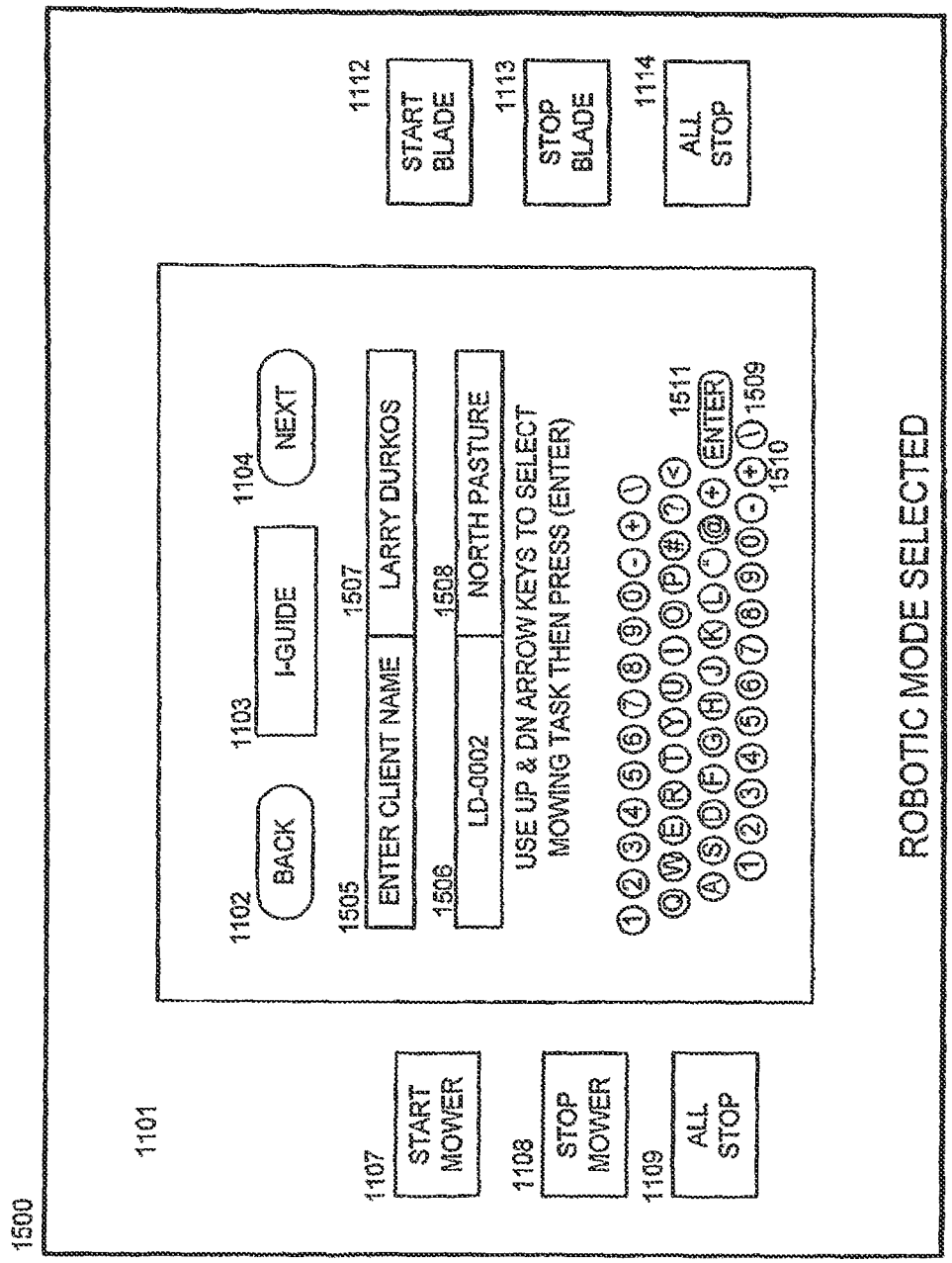
FIG. 15 is a drawing of the operator's control panel where the robotic mode has been selected and is prompting the operator to enter the client name then make a task selection from stored tasks for the selected client.

FIG. 15 illustrates the operations of the interactive control panel 1500. In this display the operator first enters the client name in frame 1507 next to frame 1505. Next the operator will use the UP arrow 1510 or DN arrow 1509 to scroll through the projects for the client name entered. The project number will appear in frame 1506 and the project description will appear in frame 1508. Once the desired project is found the operator pressed the ENTER key 1511 which will bring up a new display 1600 shown in FIG. 16 where additional selections are made.

Figure 16:
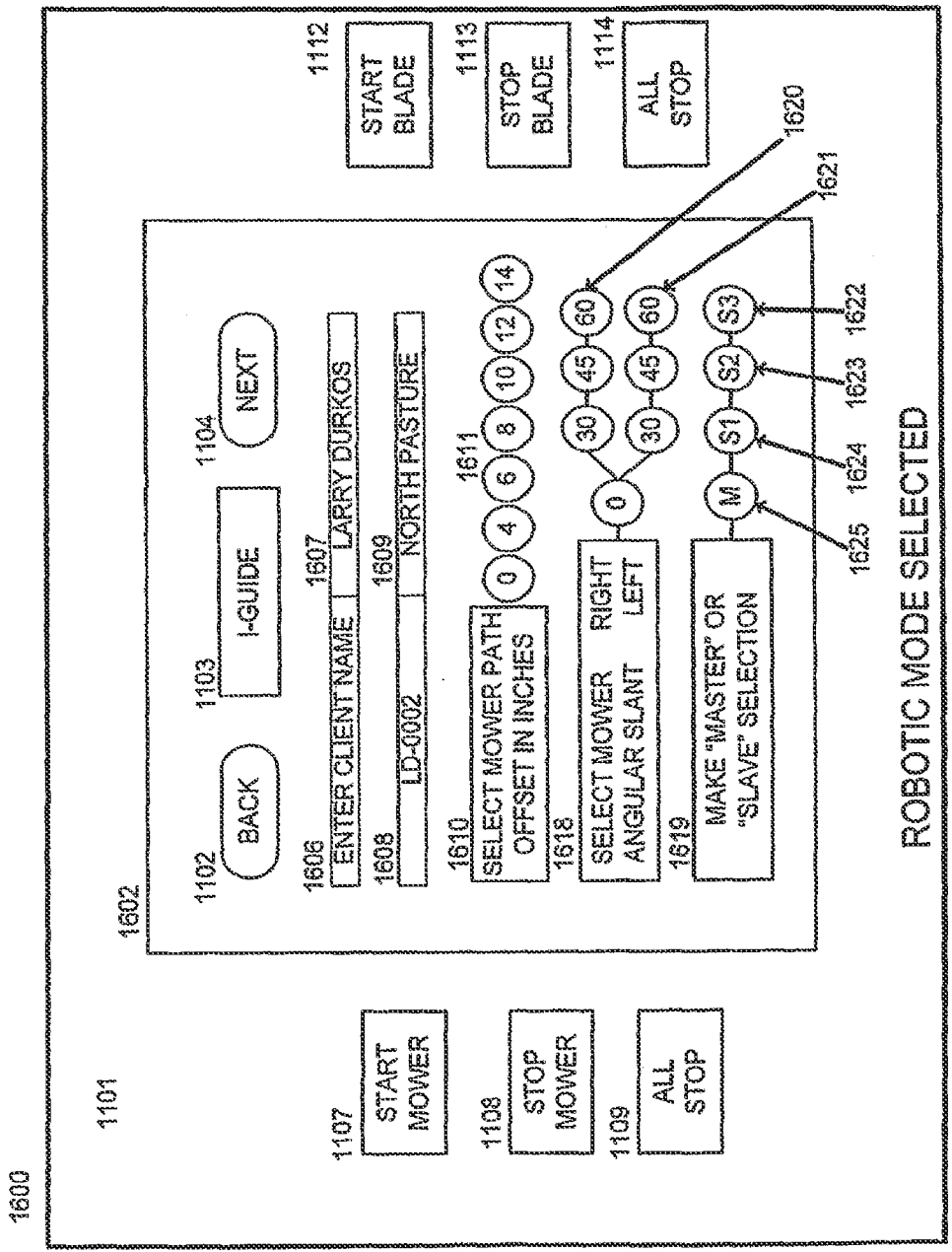
FIG. 16 is a drawing of the operator's control panel where the robotic mode has been selected and is prompting the operator to enter the parameter data about the mowing task to be executed.

FIG. 16 illustrates the operations of the interactive control panel 1600. In this display the client name is displayed in frame 1607 next to reference frame 1606 and the project number and description appear in frames 1608 and 1609, respectively. This provides client continuity during setup. Next the operator selects the mower path offset 1610 in inches using buttons 1611. This feature provides means of moving the wheel tracks to new locations each time the field is mowed. Next the operator selects the angular slant 1618 using buttons 1620 for right angles or 1621 for left angles. This feature provides means of cutting the field at a different angle in order to reduce the likelihood of a permanent pattern form being visible in the field turf.

Next the operator selects the desired master or slave mode of operation. In any given field, a number of RZTR's can be operating. One RZTR is illustratively the master 1625 and each additional RZTR is a slave 1624, 1623, 1622. Once all the above selections are made the operator presses the NEXT button 1105 which will switch the display to 1700, which is the running display.

Figure 17:
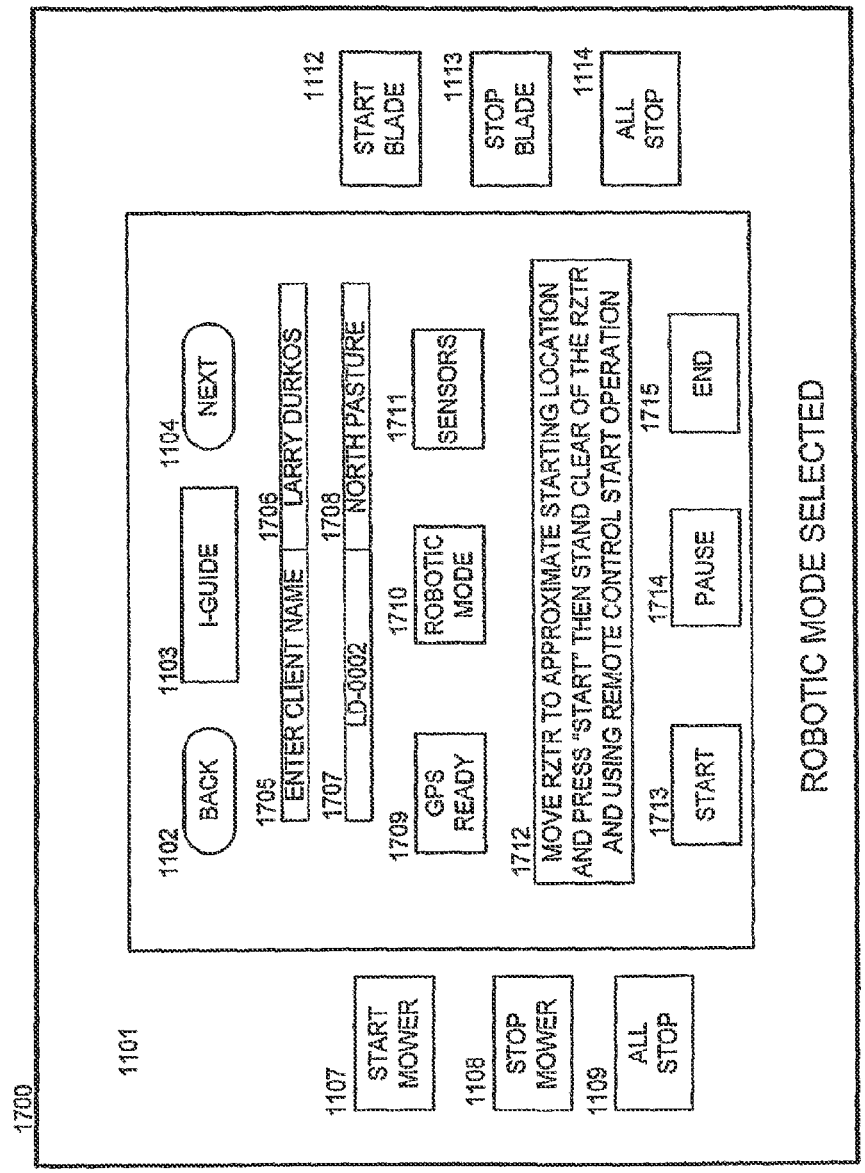
FIG. 17 is a drawing of the operators panel where the robotic mode has been selected and the mowing task has started in the robotic mode.

FIG. 17 illustrates the operations of the interactive control panel 1700. Frame 1705 and 1706 contain the client name. Frames 1707 and 1708 contain the project number and project description. Frame 1709 indicates the status of the GPS signal. Frame 1710 indicates the mode of operation. Frame 1711 indicates the sensor status. To start the operation, the operator presses the START button 1713. The operator may remain on board during the start of the mowing process then at any time press the PAUSE button 1714 or END button 1715 which will cause the RZTR to come to a stop. The operator then exits the RZTR and presses the START button on a remote control unit, which will cause the RZTR to re-start and continue until the operator intervenes with another PAUSE or until the project is completed. Messages or instructions are displayed to the operator in box 1712.

Figure 18:
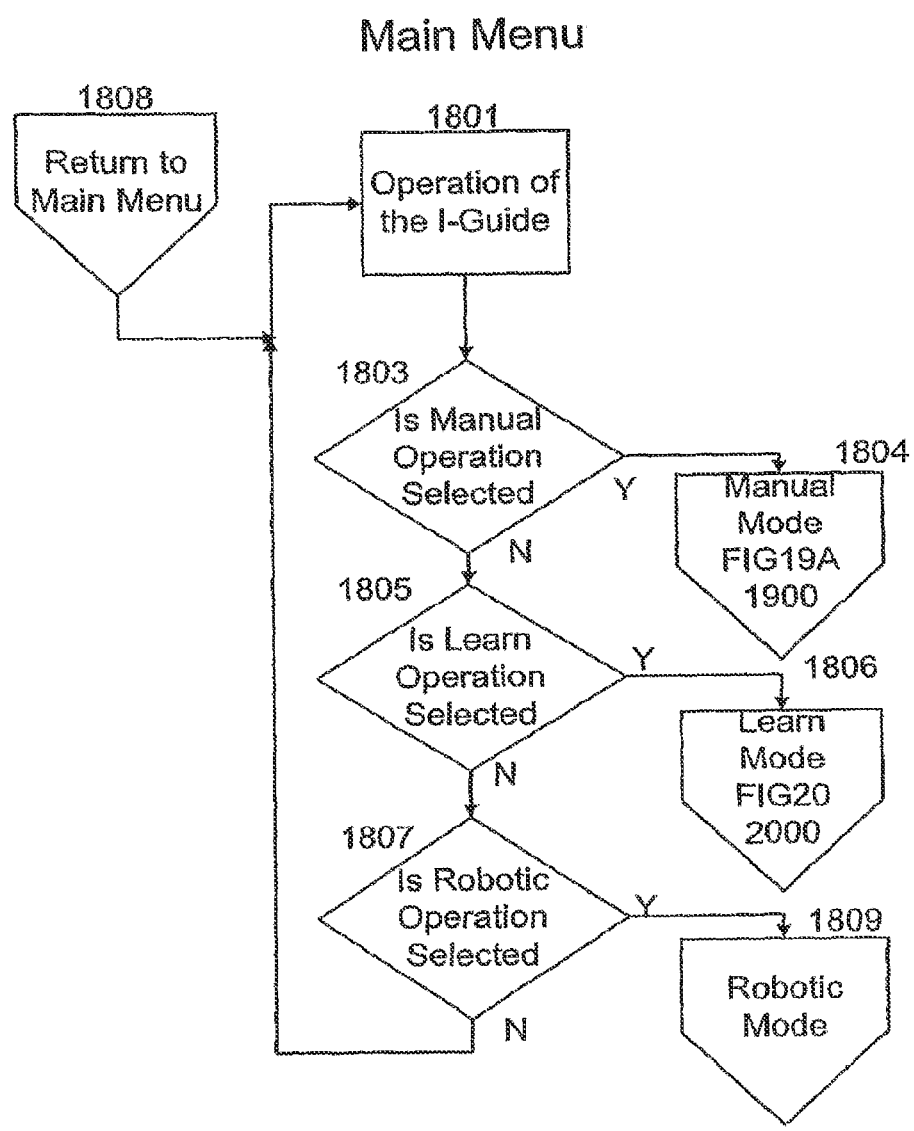
FIG. 18 is a flow chart describing the operator's Main Menu display.

FIG. 18 is a flow chart which describes the operation of the Main Menu 1100 of FIG. 11. When the RZTR is power up this Main Menu display will appear on the operator's control panel as illustrated at block 1100. The operator selects the mode of operation desired, Manual Mode 1803, Learn Mode 1805 or Robotic Mode 1807. Once any of these are selected the display switches to the chosen display as illustrated in blocks 1804, 1806 and 1809. If no selection is made, the Main Menu continues to be displayed as illustrated at block 1808.

Figure 19A:
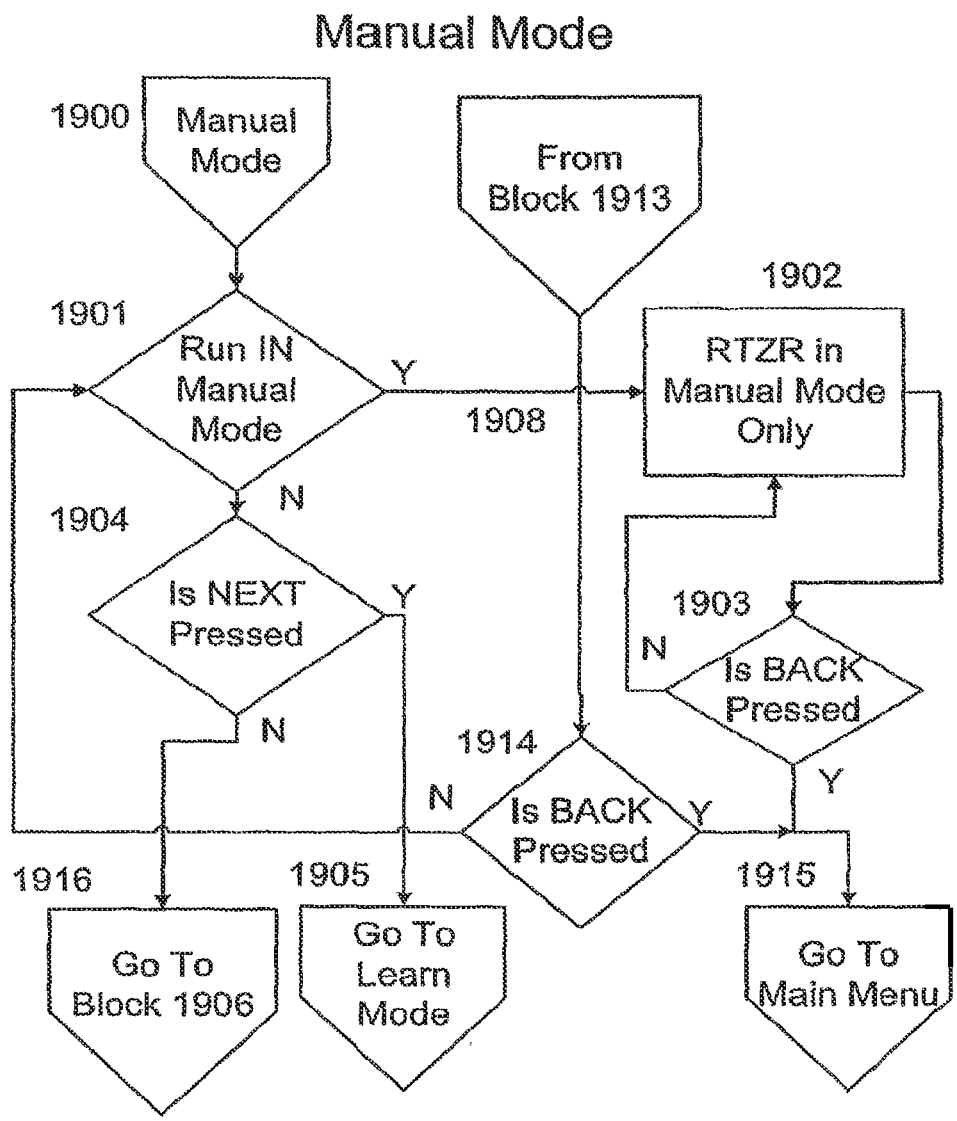
FIGS. 19A AND 19B are a flow chart describing the operator's Manual Mode display.
Figure 19B:
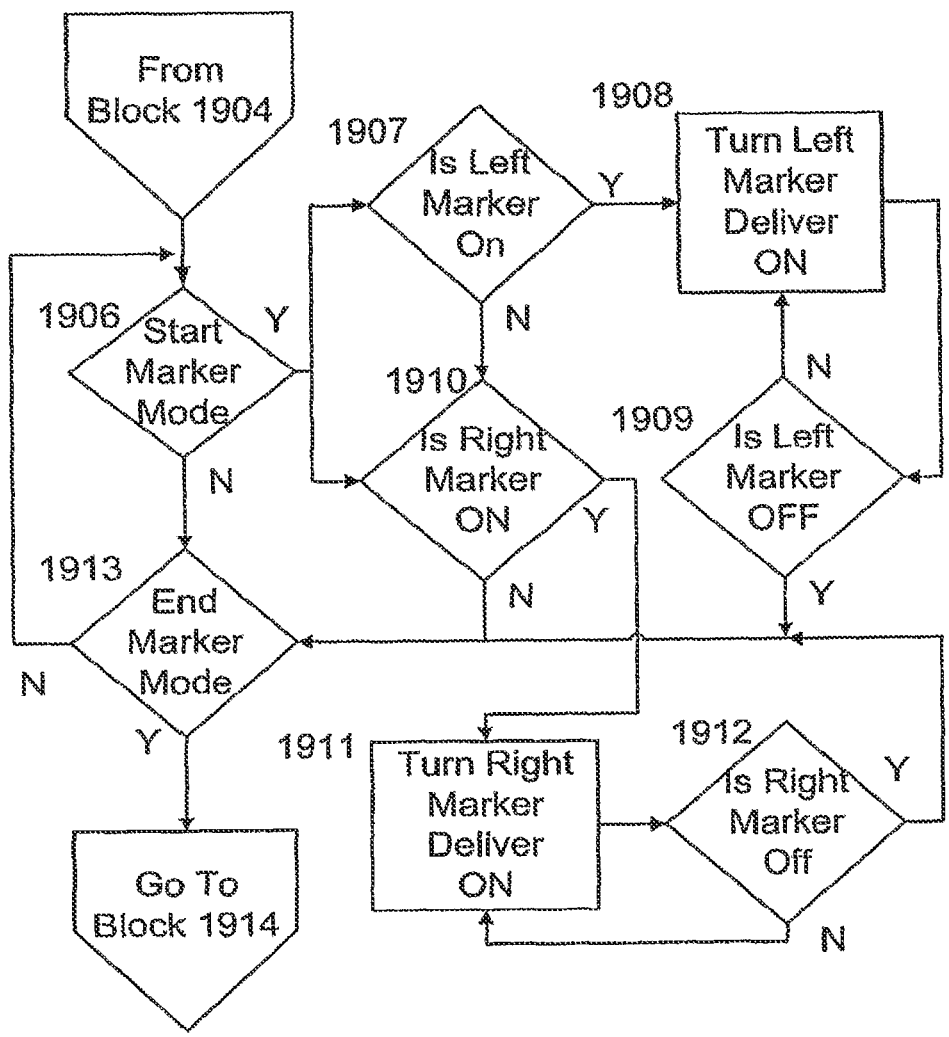

FIGS. 19A and 19B are a flow chart which describes the operation of the Manual Mode of FIG. 12 as illustrated at block 1900. If the manual mode is selected at block 1901 the RZTR operates totally manually as illustrated at block 1902. The RZTR will operate in the manual mode until the BACK button is pressed at block 1903 returning the operator to the Main Menu display of FIG. 11 as illustrated at block 1915. While in the Manual Mode if the NEXT button is pressed at block 1904 the display will advance to the Learn Mode as illustrated at 1905.

By pressing a Start Marker Mode button 1208, 1214 as illustrated at block 1906, the operator now may select either the Left or Right Marker deliver systems. Computer 106 determines whether the left or right marker buttons have been pressed at blocks 1907, 1908 and 1909 or 1910, 1911 and 1912. This control provides means for the operator to set up marker traces on the field preparing for a semi-automatic mode of operation. This mode of operation is described in FIGS. 7, 8, 9 and 10. Computer 106 also determines whether an end marker mode button is pressed at block 1913, or whether the back button 1102 is pressed as illustrated at block 1914.

Figure 20:
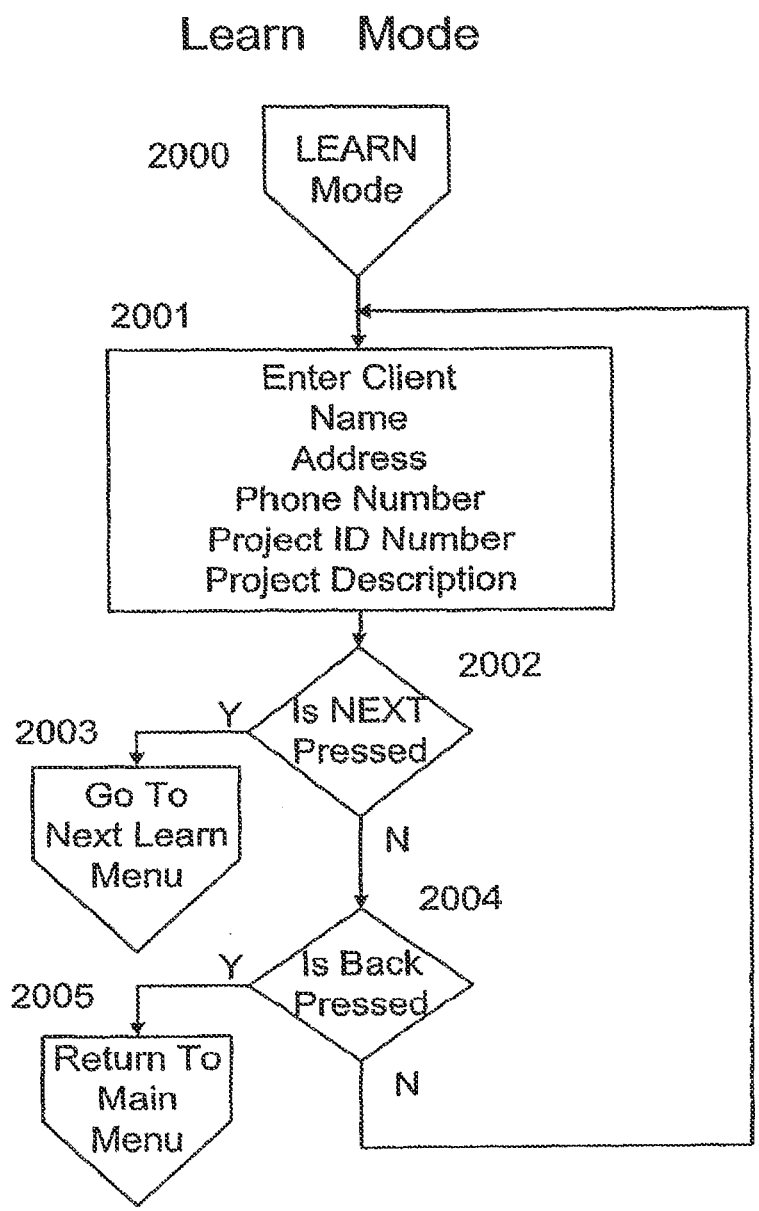
FIG. 20 is a flow chart describing the operator's Learn Mode display.

FIG. 20 is a flow chart which describes the operation of the Learn Mode beginning at block 2000. This is the first display of the Learn Mode providing means for entering Client data at block 2001 as shown in FIG. 13. While in this display the operator can return to the Main Menu by pressing the BACK button as illustrated at blocks 2004, 2005. Once the Client data has been entered, the operator then presses the NEXT button at block 2002 which advances to the next Learn Mode display at block 2003.

Figure 21A:
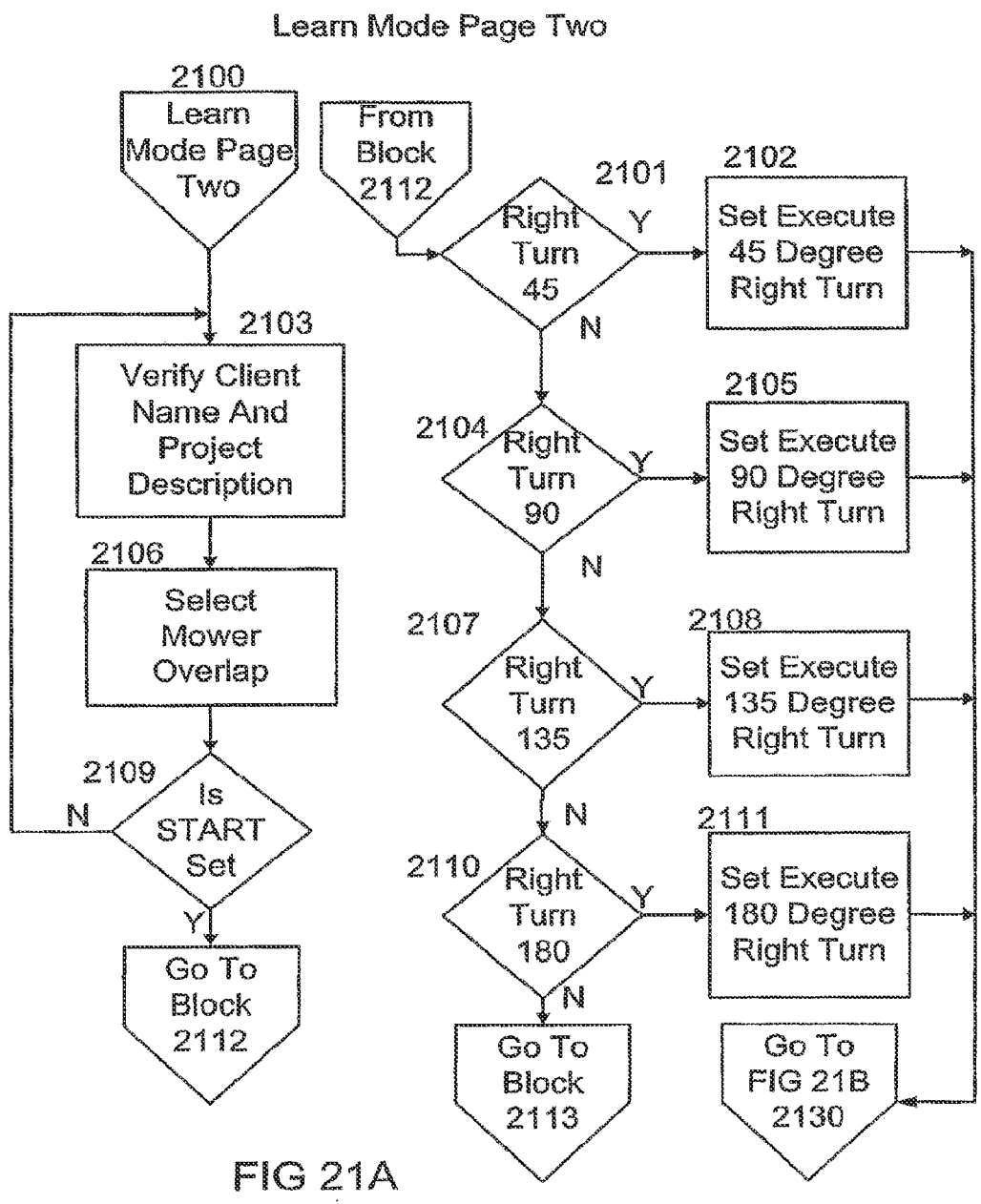
FIGS. 21A-21B are a flow chart describing the operator's Learn Mode Page Two display.
Figure 21B:
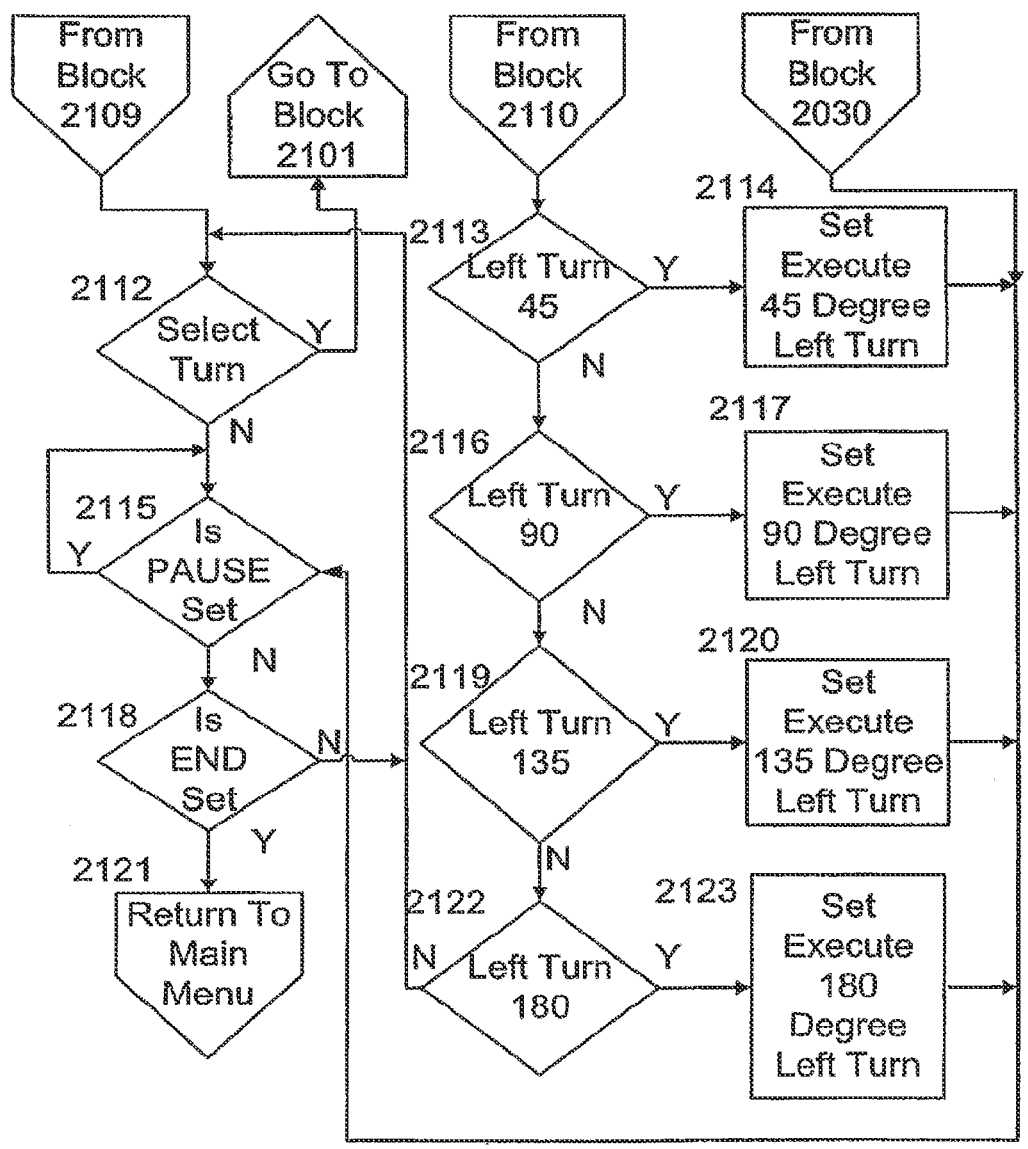

FIGS. 21A and 21B are a flow chart which further describes the operation of the Learn Mode beginning at block 2100. This display leads the operator through the remainder of the learn mode setup. First the Client name and project is verified at block 2103. Next the mower blade overlap is set at block 2106. Then computer 106 determines whether the START button is pressed at block 2109. The operator steers the RZTR over the desired mowing path. As this is done the on board computer records the path of the mower and saves it in the data memory 104. If the operator selects the TURN button at block 2112, the RZTR will execute the selected turn. The operator may select a preprogrammed turn 2101-2123 and the RZTR will execute the turn and record this data. Both position data coming from the computer monitoring both drive wheel encoders and GPS receiver data is saved in data memory 104. These two sources of data define the path over which the RZTR has passed. This data is saved in the data memory 104 under the Client Name for future use. During the Learn Mode the operator can select PAUSE button 1420 as illustrated at block 2115 which will suspend the data storage allowing the operator freedom to take any desired action without that being saved. Re-pressing the PAUSE button 1420 at block 2115 will put the RZTR back into the Learn Mode. At any time the operator can press the END button 1421 as illustrated at block 2118 which will cause the computer to save all the collected path data and close the client learn file. Computer 106 then returns to the Main Menu as illustrated at block 2121.

In one illustrated embodiment, the computer can straighten out the path driven in the LEARN mode to compensate for driver variations from a straight path and to provide proper overlap. Once the learned path is complete the entire learned path may be processed using digital filter technologies in order to remove the operator induced steering problems which caused wiggles in the original path. Parameters in the digital filter may be adjusted allowing the random wiggles to be removed from the path database but still retaining all steering data needed to avoid objects and execute turns in the mowing path. The filters are illustratively low pass type filters. Parameters may be adjusted which will set the cut point in the filter and the sharpness of the cut.

The path is stored while in "Teach or Learn Mode" with a new point captured and stored, illustratively about every 10 ms. To smooth the path, the X and Y coordinates are run through a digital low pass filter. The digital filter may illustratively be a "Window—Sinc" low pass filter. The corner frequency may be tuned to match the control response of the mower. The low pass filter filters out high frequency (shaking from side to side) or erratic movements (such as from bumps) that were done while recording in the "Learn Mode". In another embodiment, a graphical editor is used to display the path and allow an operator to edit the path by using an editor to add, delete, or edit the individual points. The coordinates and velocity can be edited.

Figure 22A:
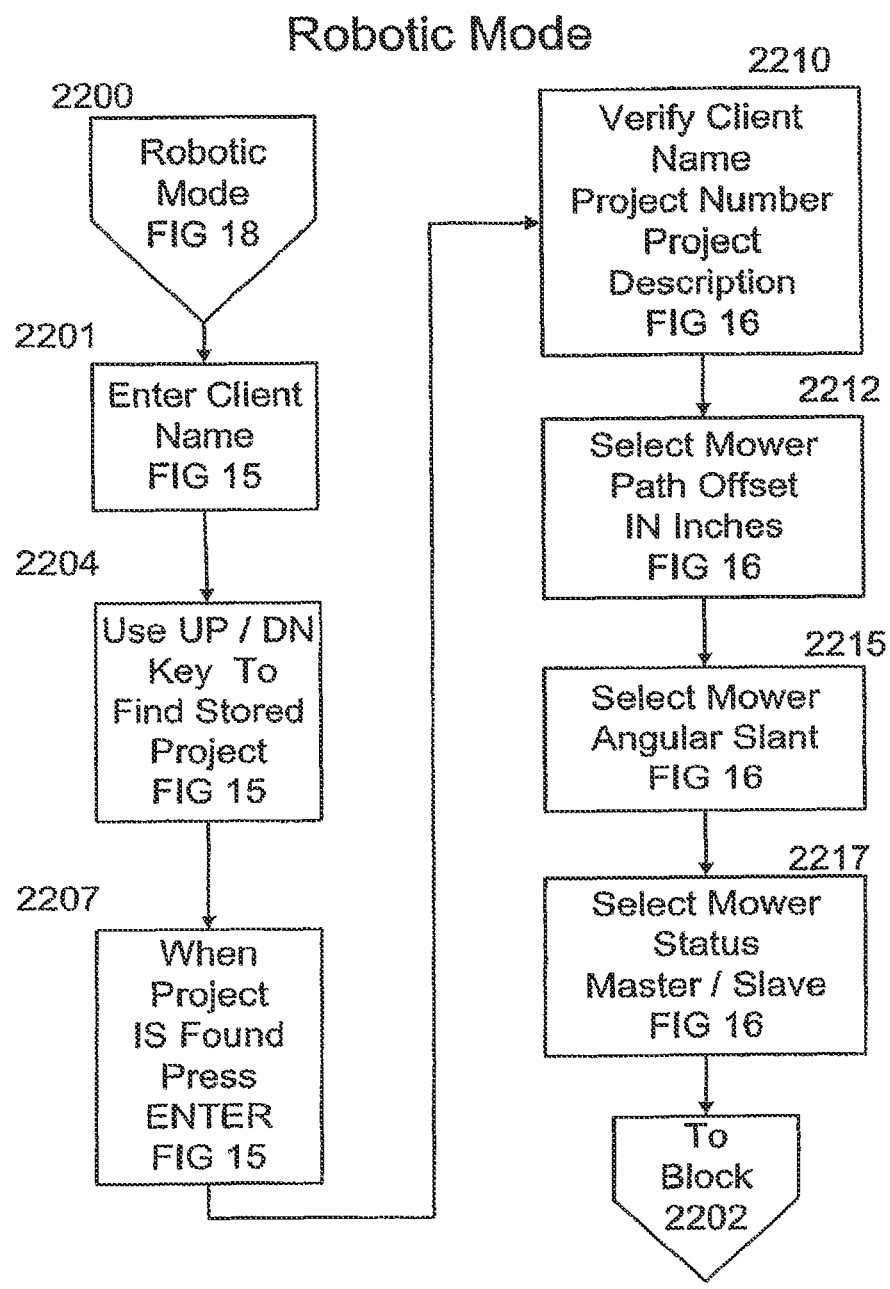
FIGS. 22A-22C are a flow chart describing the operator's Robotic Mode display.
Figure 22B:
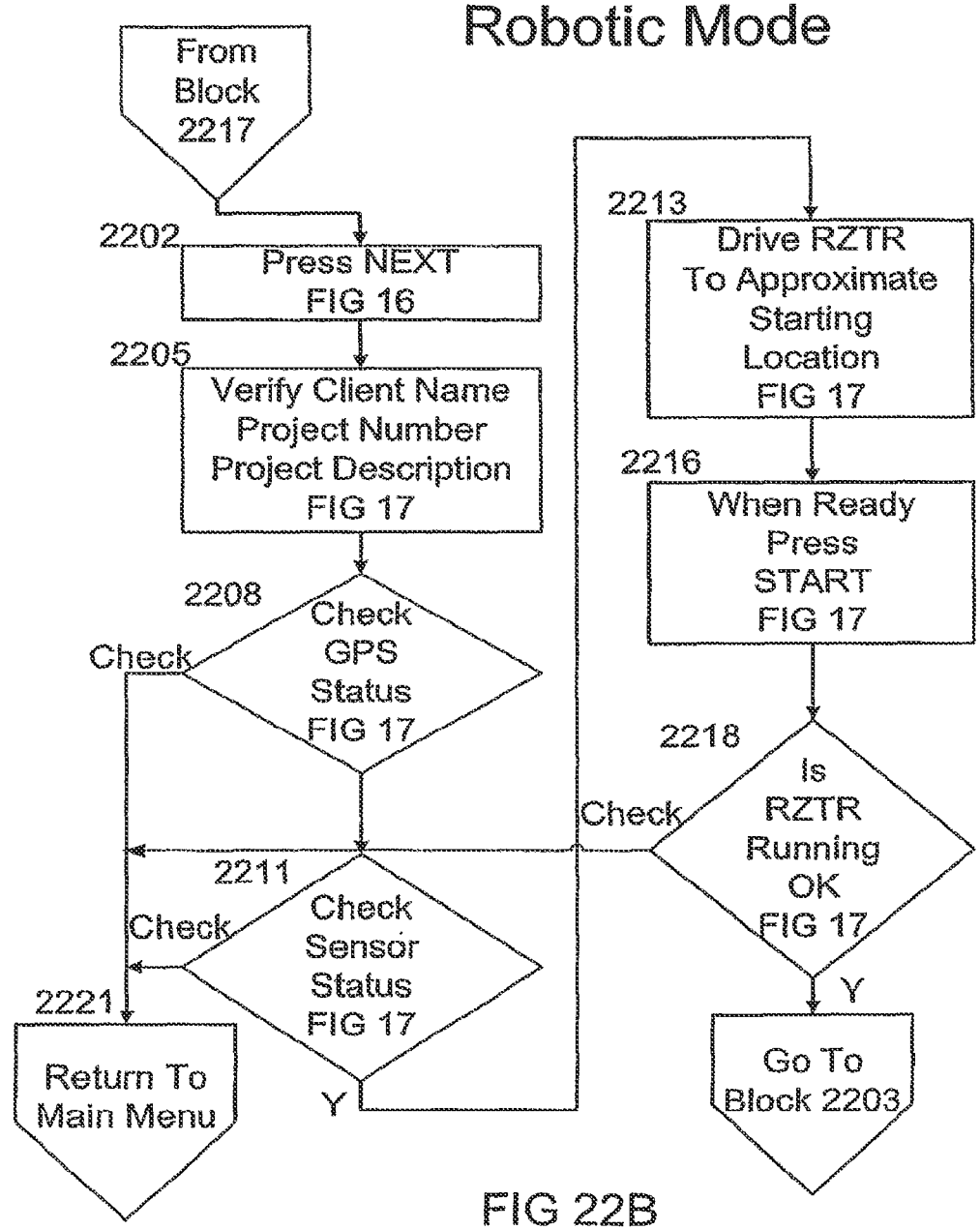
Figure 22C:
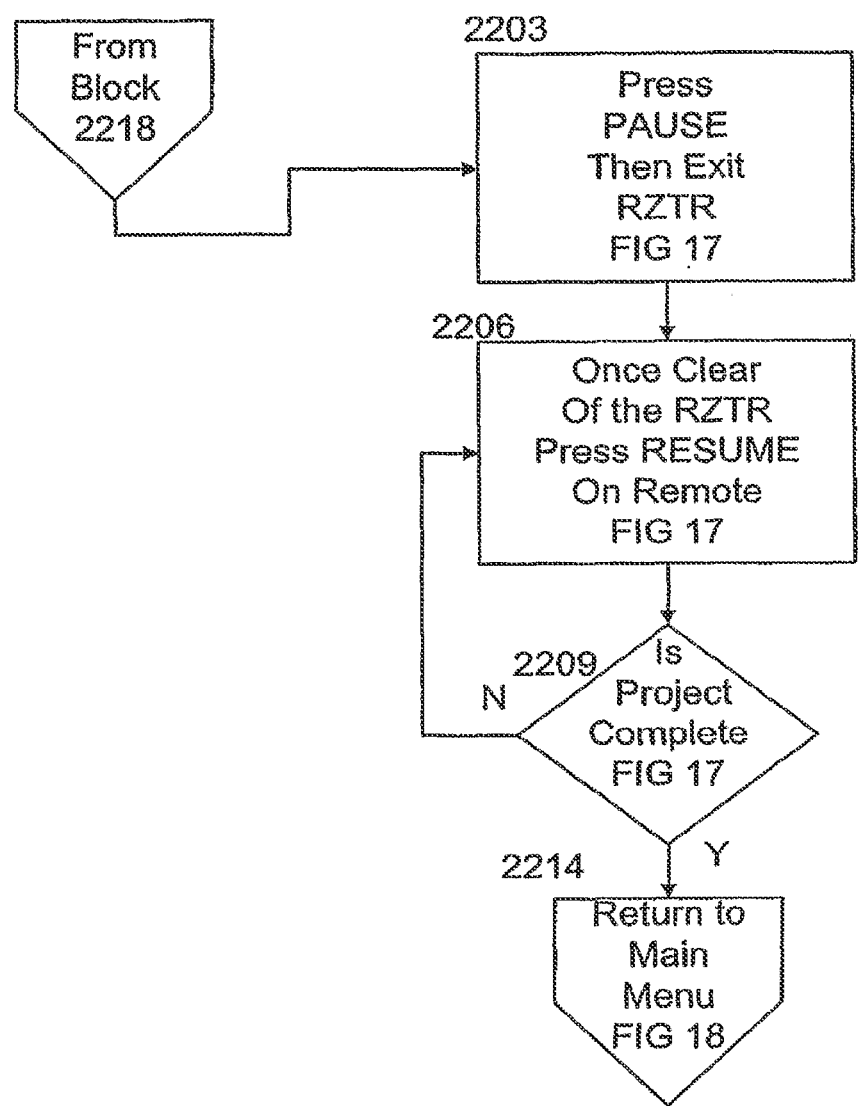

FIGS. 22A-22C are a flow chart which describes the operation of the Robotic Mode beginning at block 2200. First the Client name is entered at block 1507 of FIG. 15 as shown at block 2201. Then the up and down arrow keys 1510, 1509 are used to find a stored project as illustrated at block 2204. The ENTER button 1511 is pressed at block 2207 when the desired project is found. Next verify the client name and project at block 2210, select the mower path offset at block 2212, select the mower slant angle at block 2215, select master or slave mower at block 2217 then press the next button at block 2202 advancing the display. Again verify the client name at block 2205, check the status of the GPS signal at block 2208, check the status of the sensors at block 2211, manually drive the RZTR to the approximate starting location at block 2213 then press START at block 2216. The RZTR then begins operating on the robotic mode. When the operator is pleased with the operation at block 2218, the operator presses PAUSE button 1714 at block 2203 which will stop the RZTR allowing the operator to exit. Once the operator is clear of the RZTR, the operator then presses the PAUSE button again at block 1714 (or a PAUSE or RESUME button on the remote control) to resume operation at block 2206. The RZTR then begins operation in the full robotic mode. When the project is complete at block 2209 the RZTR will shut down alerting the operator the project is complete. Computer 106 then returns to the Main Menu of block 2214.

As discussed above, in the LEARN mode, the operator drives the machine over the desired path while the computer records information concerning controls to the right and left wheels during the manual mode. The GPS receiver 103 also receives GPS signals during the LEARN mode and records the signal at least at selected intervals along the path. In the robotic mode, the computer 106 uses the multi axis servo controller 107 to control the right and left wheels as discussed above using the stored inputs from the memory are stored during the LEARN mode. Once the machine is located at a particular point in the path, the machine can be controlled to move along the path as discussed above. Inputs from a GPS receiver are not required to move the machine along the path. However, in one embodiment, the GPS receiver is used to check the accuracy of the path as discussed above and make corrections if necessary to guide the machine back to the correct path location. The GPS signal can also be used to move the machine back to a correct location if the machine is forced to move away from the path, such as when the machine encounters an unexpected obstacle in the path which is detected by the proximity sensors or cameras.

Logic of Learn and Run Mode of Operation of the RZTR:

As discussed above, the RZTR has both a learn mode and an automatic run mode of operation. In the Learn Mode, the RZTR is driven by an operator along the desired mowing path. As the mower moves along the path the displacement is measured by encoders attached to each drive wheel. One complete revolution of a drive wheel illustratively causes the RZTR to move 45 inches. An incremental encoder with an illustrative resolution of 1000 ticks per revolution is attached to each drive wheel. Thus the 45-inch circumference is divided into 1000 increments. As the wheel rotates each tick from the encoder means the RZTR drive wheel has moved 0.045 inches. This data describes the displacement of each drive wheel along the desired path of the RZTR.

In addition to storing this encoder displacement data, an on board GPS receiver 103 receives position data. In addition data is also received by the RZTR via a cell phone, other wireless connection or Internet link 101, from a fixed GPS reference receiver. The on board GPS receiver processes both the direct data and the reference data providing an X, Y and Z Real Time Kinematics (RTK) GPS corrected position coordinates that are accurate to about 2 centimeters. This data is illustratively updated about every one second.

The encoder data defines the mower path in detail while the GPS system provides location reference points as the RZTR travels along its path. The RZTR illustratively moves at a speed of about 5 to about 25 feet per second. The encoder data provides the high-resolution data needed to navigate turns and objects with an accuracy of a fraction of one inch while the GPS data provides fixed data reference points along the path. While the encoders provide high-resolution wheel position, errors can develop since the tires may slip or bounce off the terrain resulting in a difference between the displacement of the tire and actual movement of the RZTR. When the RZTR operates in the robotic mode, the high-resolution encoder data is be used by the on board controller to navigate the RZTR over the learned path. As the RZTR moves along the path, the GPS system again provides corrected location data points every one second which will be used by the on board computer 106 to check the location of the RZTR. The computer will then adjust the RZTR location to bring it back to the proper learned path location. The wheel encoder data is used to navigate the RZTR while the GPS data is used to check absolute position, illustratively every one second.

Servo Control Hydraulic Valve and Steering Control

In FIG. 1, the manual hydraulic control valve 36, 47 used on each wheel drive motor of the RZTR 52 along with the linear actuators 48, 37 and the valve control arms 46, 35 can be replaced with a servo control valve. A manufacturer of a suitable servo control valve is illustratively Moog. The RZTR controller outputs 121 and 123 are connected to the servo control valve in this embodiment. The on board computer 106 outputs control signals to the servo control valve via right wheel outputs 108, 121 and left wheel outputs 110, 123. These signals cause the valve to open or close slightly, thereby adjusting the flow and pressure of hydraulic oil into the hydraulic drive motors 32 and 33. This increase or decrease in flow causes the motor to adjust speed. This change in speed is detected by the encoders 28 and 29 and communicated to the multi axis servo controller 107. The controller evaluates the speed change relative to the desired speed and again adjusts the servo control valve as needed. This control loop is operating on both the left and right drive motor, which enables the controller to steer the RZTR. The embedded computer 106 communicates to the multi axis servo controller 107 the stored control data saved during the learn mode. The multi axis servo controller 107 uses this data to control both drive wheels as described above. This control method assures the RZTR will follow the same path in the robotic mode as it did in the learn mode. In both the learn mode and robotic mode, the GPS receiver 103 provides coordinates accurate to about 2 cm relative the earth. The embedded computer 106 stores this data during the learn mode then during the robotic mode checks the path of the RZTR with the GPS data, for example once each second, and corrects any errors that have occurred. The computer 106 and servo controller 107 accomplish the correction as described herein.

Stepper Motor Hydraulic Valve and Steering Control

Figure 2D:
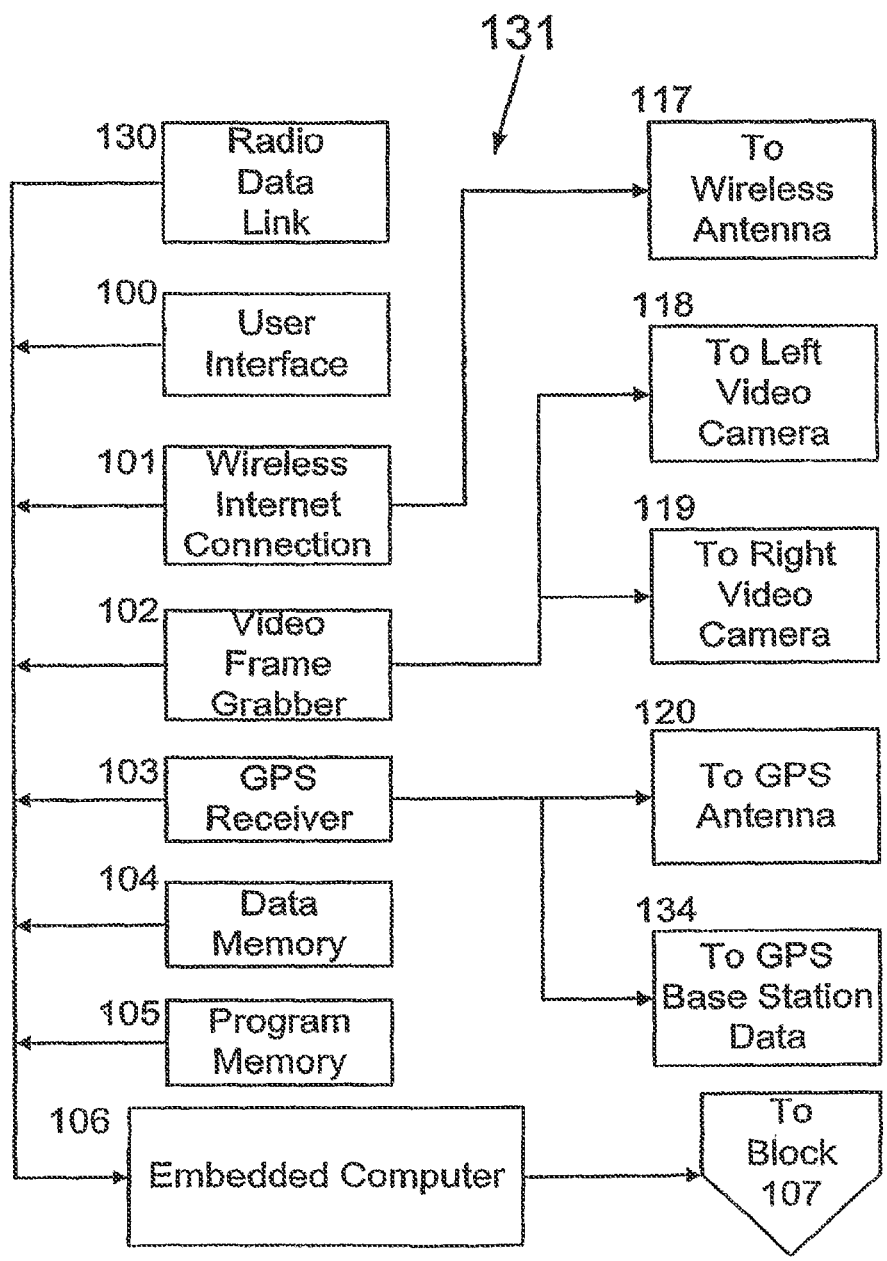
FIGS. 2D-2F are a block diagram of the major components of the RZTR controller including GPS antenna connection, Left and Right Wheel Control Stepper Driver
Figure 2E:
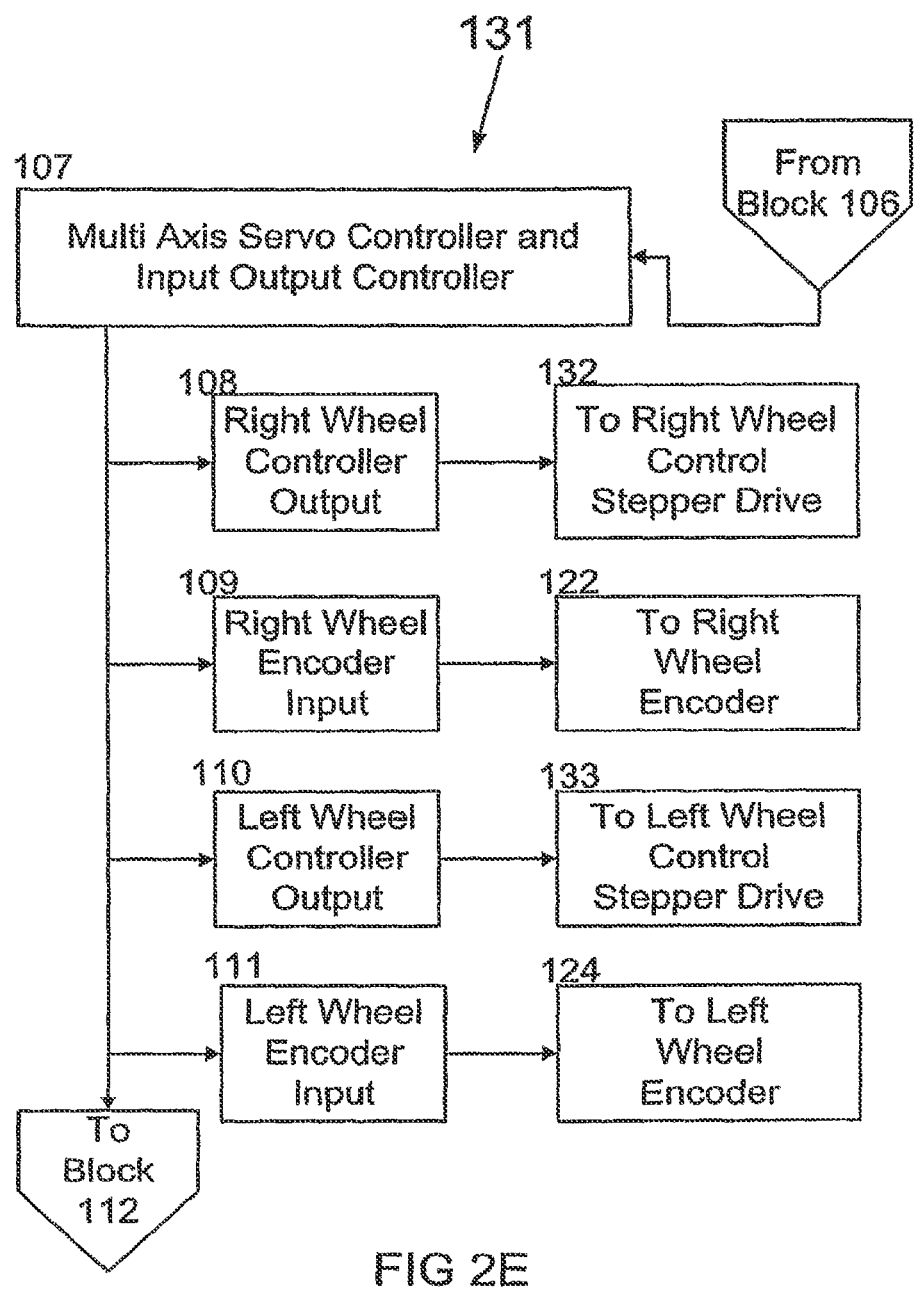
Figure 2F:
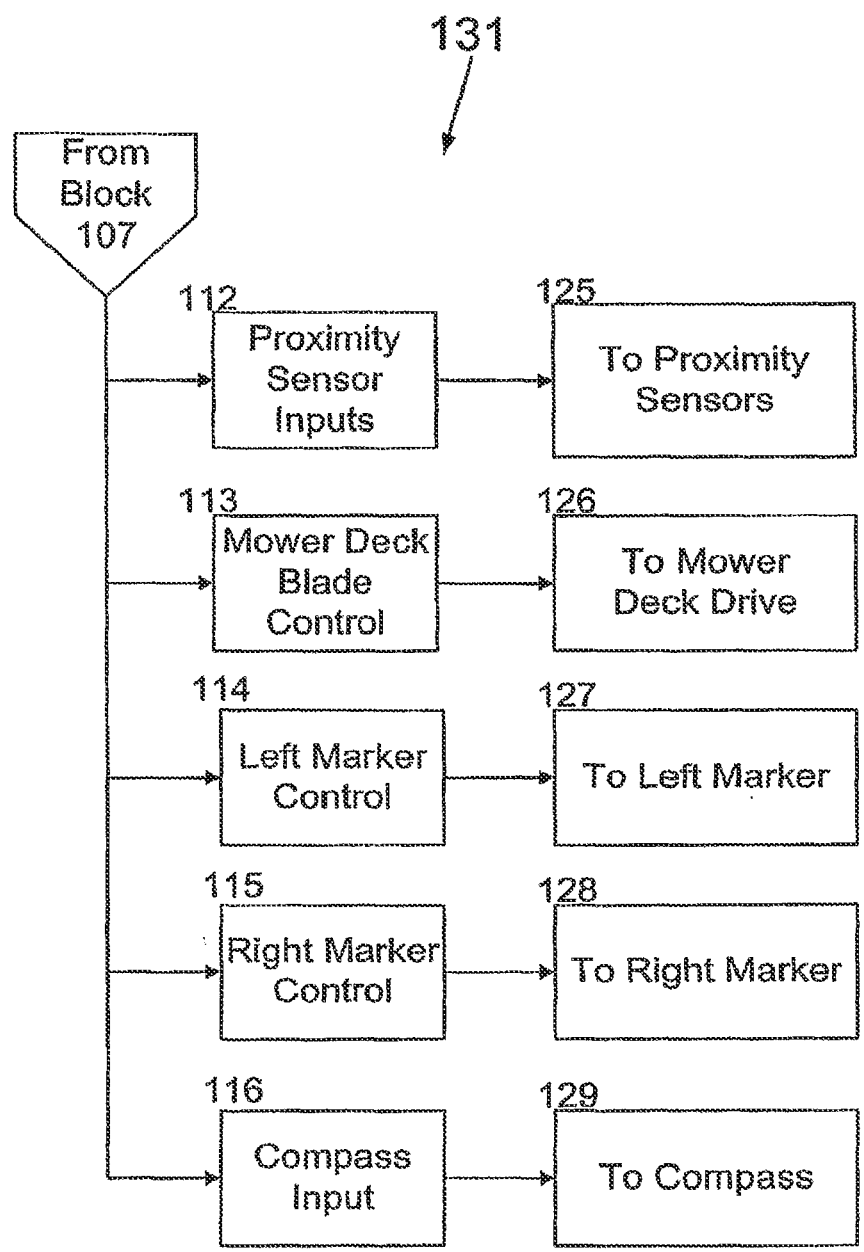

In FIG. 1A, the manual hydraulic control valves 47, 36 used on each wheel drive motor 32, 33 of the RZTR 52 are driven by the servo controller 107 and Left and Right Wheel Control Stepper Drivers 133, 132 shown in FIGS. 2D-2F which drive Left and Right Stepper Motors 56, 57 shown in FIG. 1A.

The multi axis servo controller 107 outputs drive signals to the left and right stepper motors drivers 133, 132 which drive the stepper motors 56, 57 a few steps in one direction or the other. This action causes the stepper motor 56, 57 to rotate the control shaft of the respective hydraulic control valve 47, 36 a slight amount. This action causes the associated drive wheel 44, 34 to rotate at a different speed. This change in speed is detected by the encoders 28 and 29 and communicated to the multi axis servo controller 107. The controller 107 evaluates the speed change relative to the desired speed and again adjust the stepper motor 56, 57 position as needed. This control loop is operating on both the left and right drive motor 32, 33, which enables the controller 107 to steer the RZTR. As the relative speed of the two drive wheels is adjusted as described above, the direction of the mower is continually corrected by the action of the servo controller 107 and the related components which communicate these adjustments to the two drive wheels.

The embedded computer 106 communicates to the multi axis servo controller 107 the stored control data saved during the learn mode which the multi axis servo controller 107 uses to control both drive wheels 44,24 as described above. This control method assures the RZTR will follow the same path in the robotic mode as it did in the learn mode. Both in the learn mode and robotic mode the GPS receiver 103 provides coordinates accurate to about 2 cm relative the earth. The embedded computer 106 stores this data during the learn mode then during the robotic mode checks the path of the RZTR with the GPS data, for example once each second and corrects any errors that have occurred. The computer 106 and servo controller 107 accomplish the correction as described above.

This control system can be installed on other types of equipment such as a farm tractor or other vehicle which uses the angular position of the front wheels relative to the chassis to accomplish steering of the vehicle. In this case, an encoder and drive motor is connected to the manual steering system so that the servo controller 107 measures and stores the position of the steering wheel relative to the chassis of the vehicle. Then, in the same manner described above, the control system controls the relative position of the steering wheel base on the stored data. Just as in the system described above, the GPS navigation data is used to monitor and make corrections to the position of the steering wheel in order to keep the vehicle on the learned path.

Marketing of the RZTR Base Station GPS Position Correction Data:

The RZTR is a robotic mower, which uses GPS location data to check the accuracy of location as the unit executes a learned mowing pattern. The RZTR navigates by executing a learned pattern based on data generated by encoders on each drive wheel of the RZTR. This data defines the displacement of each wheel and the speed of that displacement. In addition to storing this displacement data, GPS reference points are saved at a rate of, for example, one data point per second. These points are used by the navigation software to establish the exact location relative to the earth at any point within the mowing pattern. When the RZTR runs the learned pattern, the navigation is based primarily on the high-resolution data generated by the wheel encoders during the learn mode. This high-resolution navigation enables the RZTR to navigate complex maneuvers in areas of a field where access is challenging and limited. The RZTR is capable of repeating the exact maneuver the operator executed during the learn mode. Since the absolute location of the patterns is known within about one centimeter as the RZTR executes the learned pattern, if any accumulated errors occur in this absolute location, such errors are measured and corrected each time the GPS data is received during the robotic mowing task. In one embodiment, in order for the GPS system to provide the high precision data, the GPS receiver 103 on the mower must receive an additional set of GPS data from a fixed GPS receiver located within about 20 miles of the RZTR mower. The fixed base GPS receiver stations are illustratively located at spaced apart locations throughout the country side and the data from these stations is supplied to the users via the Internet, radio, cell phone and other forms of data transmission.

An account is illustratively created for each RZTR in the field, which may contain a log of the time the users accessed the base station GPS data. The users are then billed a predetermined amount for this usage. The accounts can operated in a number of ways such as pre-paid accounts similar to pre-paid phone cards, credit accounts that are billed monthly. The RZTR can also be equipped with a credit card reader so the user can purchase the service as needed. When the user starts the RZTR, the on-board computer 106 accesses the network requesting service. Once the communication is established the identification number of the RZTR is passed via the network to a service office server. This server validates the account and, if the account is in order, the requested data is transferred to the RZTR. The server logs the amount of time the user is receiving the service data and posts the usage charges to that account. In addition to usage time, additional data relative to functionally of the RZTR is passed to server. Software based in the server monitors this data looking for any degradation in the performance of the RZTR and will alert staff if abnormalities are found. The quality control service assures the users that the RZTR's are operating at peak performance assuring quality performance from the RZTR's.

This service is provided at a nominal fee that is a fraction of the cost of an operator driving each mower 8 to 10 hours per day. If the user chooses to lease the RZTR and use the credit card payment method then fees only accrue when the RZTR is being used affording the user savings immediately. In this mode of operation, a monthly minimum fee is charged to the credit card since both the RZTR and the service is being paid for as used. If the RZTR is purchased and only the service is purchased as used, then no monthly minimum will apply.

In addition to marketing the GPS data to RZTR users, the service will also be available to other users of high precision GPS position such as land surveying, marine navigation, agriculture equipment navigation, construction heavy equipment navigation to name a few. This marketing approach of buying the high resolution GPS data versus every user creating there own fixed base stations and by being able to pay for the GPS data as used will be very attractive to the market.

GPS System:

Precision GPS data is generated by using a GPS receiver 103 in the rover (illustratively the RZTR mower 52) and a fixed GPS Base Station receiver. The data received by the fixed receiver (Base Station) is communicated to the rover GPS receiver 103 through GPS base station data input 134. Receiver 103 combines the two signals, one from the rover GPS receiver and the other from the Base Station resulting in a GPS signal with an accuracy of about 1 to 2 cm of absolute location on the earth. As discussed above, an operating company may sell or lease the controller which is installed in the rover vehicle, which in one illustrated embodiment is a mower. The company may also sell the Base Station reference signal to the end user on an "as used" basis. The reference signal is distributed via the company's Host Server System linked to the clients via the Internet or other suitable communication system. GPS Base Stations may be installed either by the Company or by distributor of the service or by other private entities. If the Base Station is privately operated then a share of the GPS Base Station reference signal user fee is typically paid to the operator of the GPS Base Station. An additional share of the reference signal user fee may be paid to the original manufacturer that installed the Rover Controller System (RCS) in their product.

Location: Base Stations are illustratively located approximately 20 miles apart. The Base Stations may be located on cell telephone towers, at mower distributor facilities, golf courses, City Parks, private land, highway signage, or any other available site. The Base Stations are self contained requiring electrical power, Internet connectivity and telephone service.

Interconnection: The Base Station signal is illustratively encrypted and sent via the Internet or other suitable communication network to the company's Host Server Computers. In addition to sending base station data to the users the Host Server will store learned navigation paths as users define mowing paths. These navigation paths are stored on a main server. This provides a safe easily retrievable means of storing tens of thousands of user mowing patterns which will be recalled and loaded into the RZTR when the RZTR is activated at a user site. This data is passed over the Internet from the Main Server to the user's RZTR. More than one pattern may be stored for a given site.

The user may be given a list of patterns from which to select. The host server provides means for processing the stored patterns so as to generated new patterns which will improve the path of the mower resulting in a more efficient mowing and eliminating repeat wheel patterns in the turf as discussed above. These and other data processing optional services can be purchased by the user.

In another embodiment of the present invention, a single multi-frequency GPS receiver is installed on the vehicle to generate precision location data which is stored during the learn mode then used during the robotic mode as described above. It is understood that instead of a single multi-frequency GPS receiver, multiple single frequency GPS receivers may also be used on the vehicle to generate precision location data. This technology does not require GPS base station reference data or virtual reference data discussed herein in order to generate precision location data during the learn and robotic mode of operation. If desired, GPS base station data can be used on occasion, every minute or so, by the vehicle to check the quality of the on board GPS data then send this to the Host Server where a user report is generated.

In one illustrated embodiment, the location data detected by the high precision GPS receiver(s) has an accuracy within about 30 cm or less. In another illustrated embodiment, the location data detected by the high precision GPS receiver(s) has an accuracy within about 20 cm or less. In yet illustrated embodiment, the location data detected by the high precision GPS receiver(s) has an accuracy within about 10 cm or less. Preferably, the location data detected by the high precision GPS receiver(s) has an accuracy within about 5 cm or less. Even more preferably, the location data detected by the high precision GPS receiver(s) has an accuracy within about 2 cm or less.

Rover Communications: Each rover (mower) is connected to the Internet or other suitable communication network via, wireless network, cell phone, radio or other similar communication system. Each rover (mower) has a unique password embedded in the RCS 131. At the start of operation of the rover (mower) the RCS accesses, using encrypted messages, the companies host computer via the Internet to request the GPS reference signal. The encrypted message contains the password for that specific rover (mower) along with the local GPS location data. Additional data relative to the operating status of the rover can also be included in the message. Credit card data can be passed in the message to provide payment for the service at the time of usage. The company's host computer first verifies that the password sent is valid and the account requesting data is open. If the account is open, then the host computer utilizes the location of the rover to select the nearest GPS base station data and passes the reference GPS data to the rover. The host computer continues to pass base station data to the rover until an end command is sent by the rover. The host computer logs the beginning and ending time of the communication then using this data calculates the billing data for the client.

Marketing of the Product: One method of doing business is to charge for both hardware and base station reference signal data on an "as used" basis. Monthly minimums will apply. Businesses involved with the manufacture, distribution and support of the hardware and reference data may receive payments based on client usage of the RCS unit.

RCS sales: The RCS 131 is the hardware package manufactured by the company and distributed to various mower manufacturers, ATV or other application integrators who install the RCS 131 unit in their product. A RCS 131 can be sold outright or leased with an up front payment accompanied by a user fee is charged each hour the controller is in use. A minimum monthly fee is typically charged. This fee is a function of the usable months varying with length of season or other geographic and/or seasonal considerations.

The RCS 131 may be used on a wide range of products as mentioned above. This control package may be installed on equipment such as boats so the operator can learn a path then retrace the path at any time. Preprogrammed river and lake pathways are available and downloadable to the RCS 131. These pre-programmed pathways provide safe passage thru water that are filled with shoals and other underwater obstructions. These pathways have been developed by professional river and lake navigators thus assuring the casual boat enthusiasts safe passage thru dangerous waters. Safe pathway programs are also available for general water travel thus giving the craft owner and passengers freedom from the tedious task of navigation over long journeys. The pre-programmed pathways can be downloaded, for a user fee, along with the navigation data used during the trip. A user may choose to be a subscriber to the service in which case much of the cost is packaged into a monthly subscription service. The RCS 131 then automatically controls motors on the boat to navigate the boat along the predetermined path in an "automatic" mode. The boat operator can choose between manual mode and automatic mode. When automatic mode is selected, the boat is automatically guided back the a safe pathway and then along the path using GPS guidance as described herein.

This service is also available for use on land based crafts, such as golf carts. Pre-programmed pathways throughout most of the leading golf courses can be downloaded enabling the golf cart to automatically travel from one tee on the course to the next. The user may depart from the pre-programmed pathway at any time by switching to the manual mode of operation. When the operator chooses and selects the "automatic mode", the cart is returned to the robotic mode and the on-board controller automatically navigates the golf cart from its the present location back to the pre-programmed pathway. The program is intelligent and understands how to avoid obstacles on the course, using both preprogrammed obstacles or proximity detectors as describe herein.

If a golfer has moved away from the cart on foot but wishes to regain use of the cart, the golfer presses a call button on a remote cart controller which is being carried in the user's pocket. The remote controller includes a GPS receiver and transmits location coordinates to the cart controller. It is understood that other type of location data can be transmitted to the cart. When the cart receives the "call", the cart will robotically move from it resting location on the course and return to the location of the golfer automatically, avoiding obstacles along the way. The golfer can board the cart and continue the automated travel or manual control. It is understood that this remote control call feature can be used with other embodiments disclosed herein. For instance, after mowers are used to cut a field, they can be "called" back the trailer for loading using the remote control call feature.

This service can be applied to most any means of transportation, including foot travel, whether for general travel or recreational use.

Base Station GPS reference signal sales: A user fee is charged for the base station reference signal on an "as used" basis. A minimum monthly fee is typically charged. This fee is a function of the usable months varying with length of season or other geographic and/or seasonal considerations.

Loss of GPS and/or Gyro Navigation System Signals: The following is an explanation of how the RZTR deals with a short term loss of GPS and/or Gyro navigation system monitoring data during the robotic mode of operation. Since the RZTR uses the learned path based upon the wheel encoders and stored compass heading data and is steered during normal robotic operation by a servo controller 107 using that saved data, then in the event of the loss of the GPS monitoring data, the controller 107 will slow the speed of the RZTR and increase the overlap margin of the path. Controller 107 also utilizes the stored compass heading data in navigation. These actions will minimize the risk of any navigation errors resulting in a missed section of the mowing pattern. The RZTR will continue to track the learned path without GPS and/or Gyro data so this action is taken to minimize tire slippage, rough terrain bouncing the RZTR causing slippage of the tires with the terrain.

Pattern Editing: In the event that the mowing of a portion or entire section of a field needs to be skipped for reasons such as soil conditions, lawn maintenance, new structure, soil wetness or the like, the operator communicates to the controller the desire to edit the m selected pattern and follows the menu of instructions provided by a Pattern Editing Menu.

Once the operator has completed the editing function as defined by the Pattern Editing Menu, the resulting change in the mowing pattern can be either a permanent change in which case a new pattern will be defined and recorded or if the change is temporary the change is not recorded.

Safety Feature: Other mower, tractors, hauling machines that are equipped with the RCS 131 have the capability to alert the field supervisor if any two machines are on a collision course. The RCS equipped machines will minimize the risk of collision because of the intelligence built into the RCS. A report of any near collisions is communicated to the field supervisor. If any machine equipped with the RCS controller detects an object in the pathway of the machine, the RCS controller will either steer around the object or stop. In either event the field supervisor will be alerted to this event. The RCS 131 has the capability to monitor a variety of sensors such as machine vision, laser scanner, ultrasonic, infrared vision devices, standard infrared proximity sensors, cameras and others giving the RCS the capability to detect objects in the pathway and respond in an intelligent manner. If the RCS needs advice of how to respond to a detected object beyond built in intelligence, the RCS can communicate with the field supervisor or the company's object avoidance help service in an attempt to make a decision of how to react to the object. Either can review pictures of the object communicated from the on board cameras as well as data from on board sensors.

Although the invention has been described in detail with reference to the certain preferred embodiment, variations and modifications exist within the scope and sprit of the present invention as described and defined in the following claims.

What is claimed is:

1. A self-propelled vehicle comprising:
a frame;
a plurality of wheels coupled to the frame;
a hydraulic motor supported by the frame, the hydraulic motor being coupled to at least one drive wheel selected from the plurality of wheels to provide power to rotate the at least one drive wheel;
a hydraulic control valve coupled to the hydraulic motor; and
a stepper motor coupled to the hydraulic control valve, the stepper motor being configured to adjust an output from the hydraulic control valve to control the hydraulic motor and adjust the speed and direction of rotation of the at least one drive wheel.

2. The vehicle of claim 1, wherein the hydraulic control valve includes a rotatable control shaft configured to adjust an output of the hydraulic control valve, the stepper motor being coupled to the control shaft to selectively rotate the control shaft in first and second directions to adjust the speed and direction of the at least one drive wheel.

3. The vehicle of claim 1, further comprising an encoder coupled to the hydraulic motor to detect a speed and a direction of the at least one drive wheel, and a controller coupled to the encoder, the encoder transmitting signals indicative of the speed and direction of the at least one drive wheel to the controller.

4. The vehicle of claim 3, wherein the controller is coupled to the stepper motor, the controller providing a control signal to the stepper motor to adjust the speed and direction of the at least one drive wheel.

5. A method of moving at least two machines along a desired path comprising:
storing path data indicating a desired path of travel for the at least two machines;
providing at least two machines located at different positions on the desired path;
communicating path data to the at least two machines; and
automatically moving the at least two machines simultaneously to traverse the desired path using the path data.

6. The method of claim 5, wherein the at least two machines begin at spaced apart starting positions along the desired path so that together the at least two machines traverse the entire desired path without overlap.

7. The method of claim 5, wherein a first machine starts at a first starting position along the desired path and a second machine starts at a second starting position along the desired path, the a first machine being stopped after reaching the second starting position so that together the first and second machines traverse the entire path without overlap.

8. The method of claim 5, further comprising:
storing a plurality of GPS locations linked to particular points along the desired path;
detecting GPS location signals at a plurality of locations along the paths actually traveled by the at least two machines;
comparing the GPS location signals at a plurality of locations along the traveled paths with the corresponding stored GPS locations that were linked to particular points along the desired path; and
correcting positions of the at least two machines if it is determined that the at least two machines have moved away from the desired path by a predetermined amount based on the comparing step.

9. The method of claim 8, further comprising transmitting a GPS reference signal to the at least two machines to correct the detected GPS locations; determining a corrected GPS location at a plurality of locations along the path actually traveled by the at least two machines based on detected GPS location signals and the GPS reference signal; and comparing the corrected GPS locations at the plurality of locations along the path actually traveled by the at least two machines with the corresponding stored GPS locations that were linked to particular points along the desired path during the comparing step.

10. The method of claim 9, further comprising charging a fee based on usage of the GPS reference signal.

11. The method of claim 5, wherein the at least two machines are lawn mowers.

12. The method of claim 5, further comprising the step of selecting a path offset and adjusting the stored path data to provide the selected offset from the initially stored path data so that the at least two machines do not follow the exact same path each time the at least two machines are moved along the desired path.

13. The method of claim 5, wherein a first machine is a master machine and at least one other machine is a slave machine.

14. The method of claim 13, wherein the master machine communicates the stored path data to the at least one slave machine.

15. The method of claim 13, wherein the master machine communicates stored GPS locations linked to particular points along the desired path to the at least one slave machine.

16. The method of claim 5, further comprising charging a fee based on an amount of time the machines are operated.

17. The method of claim 5, further comprising:
wherein the step of storing path data indicating a desired path of travel for the at least two machines includes detecting and storing path data including a plurality of GPS locations linked to particular points along the desired path of travel during operation of a machine in a manual learn mode to traverse the entire desired path to be followed by the machines during subsequent operation in a robotic mode;
detecting GPS location signals at a plurality of locations along the path actually traveled by the at least two machines in the robotic mode;
receiving a GPS reference signal with the least two machines;
determining a corrected GPS location at each of the plurality of locations along the path actually traveled by the least two machines based on detected GPS location signals and the GPS reference signal;
automatically comparing the corrected GPS locations at a plurality of locations along the traveled path during the robotic mode with the corresponding stored GPS locations that were linked to particular points along the desired path;
using the compared GPS locations during operation of the least two machines in the robotic mode.

18. The method of claim 5, wherein the at least two machines are mowers, and further comprising providing a control panel having a plurality of user inputs to initiate operation of a mower in the manual learn mode, to initiate operation of the at least two mowers in the robotic mode, to start and stop the at least two mowers, and to start and stop a blade of the at least two mowers.

19. A method of moving at least two machines along a desired path comprising:
storing path data indicating a desired path of travel for the at least two machines;
providing at least two machines located at different positions on the desired path; and
automatically moving the at least two machines simultaneously to traverse the desired path using the path data, wherein the at least two machines begin at spaced apart starting positions along the desired path so that together the at least two machines cooperate to traverse the entire desired path.

* * * * *